(12) United States Patent
Dan-Jumbo

(10) Patent No.: US 9,492,975 B2
(45) Date of Patent: Nov. 15, 2016

(54) STRUCTURAL BONDED PATCH WITH TAPERED ADHESIVE DESIGN

(71) Applicant: The Boeing Company, Chicago, IL (US)

(72) Inventor: Eugene A. Dan-Jumbo, Bothell, WA (US)

(73) Assignee: The Boeing Company, Chicago, IL (US)

( * ) Notice: Subject to any disclaimer, the term of this patent is extended or adjusted under 35 U.S.C. 154(b) by 214 days.

(21) Appl. No.: 14/267,220

(22) Filed: May 1, 2014

(65) Prior Publication Data

US 2014/0238579 A1 Aug. 28, 2014

Related U.S. Application Data

(60) Continuation-in-part of application No. 13/902,816, filed on May 26, 2013, now Pat. No. 8,828,515, which is a division of application No. 12/400,519, filed on Mar. 9, 2009, now Pat. No. 8,449,703.

(51) Int. Cl.
*B29C 73/10* (2006.01)
*B64F 5/00* (2006.01)
*B32B 43/00* (2006.01)
(Continued)

(52) U.S. Cl.
CPC ............... *B29C 73/10* (2013.01); *B32B 43/00* (2013.01); *B64F 5/0081* (2013.01); *C09J 7/0296* (2013.01); *B29L 2031/3076* (2013.01); *B64C 2001/0072* (2013.01); *Y02T 50/433* (2013.01); *Y10T 428/24802* (2015.01); *Y10T 428/24959* (2015.01)

(58) Field of Classification Search
CPC .......... B29C 73/10; B32B 428/24802; B32B 428/24959; B64F 5/0081
USPC ................. 428/195.1, 414, 195, 1; 156/94
See application file for complete search history.

(56) References Cited

U.S. PATENT DOCUMENTS 3,995,080 A 11/1976 Cogburn et al.
4,352,707 A 10/1982 Wengler et al.
(Continued)

FOREIGN PATENT DOCUMENTS

EP 1775445 A2 4/2007
EP 1972429 A2 9/2008
(Continued)

OTHER PUBLICATIONS

International Search Report and Written Opinion, dated May 27, 2015, regarding Application No. PCT/US2015/012897, 10 pages.
(Continued)

*Primary Examiner* — Bruce H Hess
(74) *Attorney, Agent, or Firm* — Yee & Associates, P.C.

(57) ABSTRACT

A method and apparatus for reworking a composite structure. A composite rework patch system comprises a composite rework patch and a plurality of adhesive layers. The composite rework patch includes a first side having a contour conforming to an inconsistent area on the composite structure. The composite re patch comprises a plurality of regions having different structural properties. The plurality of adhesive layers is on the first side of the composite rework patch. The plurality of adhesive layers change in thickness within at least one region of the composite rework patch to form tapered adhesive sections.

15 Claims, 14 Drawing Sheets

(51) Int. Cl.
*C09J 7/02* (2006.01)
*B29L 31/30* (2006.01)
*B64C 1/00* (2006.01)

(56) References Cited

U.S. PATENT DOCUMENTS

| | | |
|---|---|---|
| 4,497,404 A | 2/1985 | Lowrance |
| 4,588,626 A | 5/1986 | Cologna et al. |
| 4,808,253 A | 2/1989 | Mimbs |
| 4,818,584 A | 4/1989 | Eisenmann |
| 4,820,564 A | 4/1989 | Cologna et al. |
| 4,824,500 A | 4/1989 | White et al. |
| 4,858,853 A | 8/1989 | Westerman et al. |
| 4,912,594 A | 3/1990 | Bannink et al. |
| 4,916,880 A | 4/1990 | Westerman, Jr. |
| 4,961,799 A | 10/1990 | Cologna et al. |
| 4,967,799 A | 11/1990 | Bradshaw et al. |
| 4,978,404 A | 12/1990 | Westerman, Jr. |
| 5,023,987 A | 6/1991 | Wuepper et al. |
| 5,034,254 A | 7/1991 | Cologna et al. |
| 5,190,611 A | 3/1993 | Cologna et al. |
| 5,207,541 A | 5/1993 | Westerman et al. |
| 5,214,307 A | 5/1993 | Davis |
| 5,232,962 A | 8/1993 | Dershem et al. |
| 5,344,515 A | 9/1994 | Chenock, Jr. |
| 5,492,466 A | 2/1996 | Frailey |
| 5,601,676 A | 2/1997 | Zimmerman et al. |
| 5,618,606 A | 4/1997 | Sherrick et al. |
| 5,620,768 A | 4/1997 | Hoffmann, Sr. |
| 5,626,934 A | 5/1997 | Brewer |
| 5,709,469 A | 1/1998 | White et al. |
| 5,868,886 A | 2/1999 | Alston et al. |
| 5,882,756 A | 3/1999 | Alston et al. |
| 5,993,934 A | 11/1999 | Reese et al. |
| 6,149,749 A | 11/2000 | McBroom |
| 6,206,067 B1 | 3/2001 | Kociemba et al. |
| 6,265,333 B1 | 7/2001 | Dzenis et al. |
| 6,468,372 B2 | 10/2002 | Kociemba et al. |
| 6,472,758 B1 | 10/2002 | Glenn et al. |
| 6,656,299 B1 | 12/2003 | Grosskrueger et al. |
| 6,680,099 B1 | 1/2004 | Brewer |
| 6,758,924 B1 | 7/2004 | Guijt |
| 6,761,783 B2 | 7/2004 | Keller et al. |
| 7,325,771 B2 | 2/2008 | Stulc et al. |
| 7,398,698 B2 | 7/2008 | Griess et al. |
| 7,404,474 B2 | 7/2008 | Yamaki et al. |
| 7,628,879 B2 | 12/2009 | Ackerman |
| 7,935,205 B2 | 5/2011 | Bogue et al. |
| 8,263,212 B2 | 9/2012 | Care |
| 8,409,384 B2 | 4/2013 | Dan-Jumbo et al. |
| 8,449,703 B2 | 5/2013 | Dan-Jumbo et al. |
| 8,524,356 B1 | 9/2013 | Dan-Jumbo et al. |
| 8,540,909 B2 | 9/2013 | Dan-Jumbo et al. |
| 8,617,694 B1 | 12/2013 | Dan-Jumbo et al. |
| 8,802,213 B2 | 8/2014 | Dan-Jumbo et al. |
| 8,828,515 B2 | 9/2014 | Dan-Jumbo et al. |
| 2001/0008161 A1 | 7/2001 | Kociemba et al. |
| 2003/0075259 A1 | 4/2003 | Graham |
| 2003/0188821 A1 | 10/2003 | Keller et al. |
| 2005/0022923 A1 | 2/2005 | Korchnak et al. |
| 2005/0053787 A1 | 3/2005 | Yamasaki et al. |
| 2006/0011435 A1 | 1/2006 | Yamaki et al. |
| 2006/0029807 A1 | 2/2006 | Peck |
| 2006/0060705 A1 | 3/2006 | Stulc et al. |
| 2006/0198980 A1 | 9/2006 | Westerdahl |
| 2006/0243860 A1 | 11/2006 | Kismarton |
| 2007/0095457 A1 | 5/2007 | Keller et al. |
| 2007/0100582 A1 | 5/2007 | Griess et al. |
| 2007/0289692 A1 | 12/2007 | Bogue et al. |
| 2009/0053406 A1 | 2/2009 | Ackerman |
| 2010/0047541 A1 | 2/2010 | Care |
| 2010/0227105 A1 | 9/2010 | Dan-Jumbo et al. |
| 2010/0227106 A1 | 9/2010 | Dan-Jumbo et al. |
| 2010/0227117 A1 | 9/2010 | Dan-Jumbo et al. |
| 2010/0233424 A1 | 9/2010 | Dan-Jumbo et al. |
| 2013/0260077 A1 | 10/2013 | Dan-Jumbo et al. |
| 2013/0337214 A1 | 12/2013 | Dan-Jumbo et al. |
| 2014/0020221 A1 | 1/2014 | Dan-Jumbo et al. |
| 2014/0076481 A1 | 3/2014 | Dan-Jumbo et al. |

FOREIGN PATENT DOCUMENTS

| | | |
|---|---|---|
| EP | 2055466 A2 | 5/2009 |
| WO | WO2009026442 A1 | 2/2009 |
| WO | WO2010104676 A1 | 9/2010 |
| WO | WO2010104741 A1 | 9/2010 |
| WO | WO2010104745 A1 | 9/2010 |
| WO | WO2010104746 A1 | 9/2010 |

OTHER PUBLICATIONS

State Intellectual Office of PRC Notification of Third Office Action and English Translation, issued Jul. 30, 2015, regarding Application No. 201080007776.6, 3 pages.
Office Action, dated Jan. 14, 2016, regarding U.S. Appl. No. 13/945,475, 49 pages.
Notice of Allowance, dated Jul. 9, 2014, regarding U.S. Appl. No. 13/902,816, 12 pages.
Notice of Allowance, dated Apr. 9, 2014, regarding U.S. Appl. No. 13/902,855, 12 pages.
Office Action, dated Jan. 5, 2012, regarding U.S. Appl. No. 12/400,519, 21 pages.
Final Office Action, dated Jun. 7, 2012, regarding U.S. Appl. No. 12/400,519, 14 pages.
Notice of Allowance, dated Oct. 18, 2012, regarding U.S. Appl. No. 12/400,519, 20 pages.
International Search Report, dated Jun. 25, 2010, regarding Application No. PCT/US2010/025181 (WO2010104676), 3 pages.
International Search Report, dated May 21, 2010, regarding Application No. PCT/US2010/026229 (WO2010104741), 3 pages.
International Search Report, dated Jun. 29, 2010, regarding Application No. PCT/US2010/026252 (WO2010104745), 3 pages.
International Search Report, dated Jun. 29, 2010, regarding Application No. PCT/US2010/026256 (WO2010104746), 7 pages.
Baker, "Repair Techniques for Composite Structures," In: Composite Materials in Aircraft Structures, Middleton (Ed.), Longman, Jan. 1, 1990, pp. 207-227.
Berthelot, "Effect of the Stacking Sequence on Mat and Cloth Reinforcement Materials," In: Composite Materials: Mechanical Behavior and Structural Analysis (Cole, Trans.), Springer Publishing, New York, 1998, pp. 312-345.
Chang et al., "Properties and failure mechanisms of z-pinned laminates in monotonic and cyclic tension," Composites Part A: Applied Science and Manufacturing, vol. 37, No. 10, Oct. 2006, pp. 1501-1513.
Chang, "A Study on Fracture Toughness of Advanced Structural Composites," Naval Air Development Center Report No. EW-4-73, Jul. 1973, 113 pages.
Dan-Jumbo et al., "Bonded Patch Having Multiple Zones of Fracture Toughness," U.S. Appl. No. 12/706,799, filed Feb. 17, 2010, 47 pages.
Dan-Jumbo et al., "Discretely Tailored Multi-Zone Bondline for Fail-Safe Structural Repair," U.S. Appl. No. 12/903,489, filed Oct. 13, 2010, 43 pages.
Gacoin et al., "Comparison between experimental and numerical study of the adhesively bonded scarf joint and double scarf joint: Influence of internal singularity created by geometry of the double scarf joint on the damage evolution," International Journal of Adhesion and Adhesives, vol. 29, No. 5, Jul. 2009, pp. 572-579.
Harman et al., "Improved design methods for scarf repairs to highly strained composite aircraft structure," Composite Structures, vol. 75, No. 1-4, Sep. 2006, pp. 132-144.
Kan et al., "Advanced Certification Methodology for Composite Structures," U.S. Department of Transportation Federal Aviation Administration Final Report No. DOT/FAA/AR-96/111, Apr. 1997, 167 pages.
Kelly, "Composite Structure Repair," AGARD Report No. 716, Feb. 1984, 26 pages.

(56) References Cited

OTHER PUBLICATIONS

Komoroski et al., "Stacking Sequence Effects and Delamination Growth in Graphite/Epoxy Laminates Under Compression-Dominated Fatigue Loading," In: Composite Materials: Fatigue and Fracture—Fifth Volume, Martin (Ed.), ASTM International, Oct. 1995, pp. 249-267.
Mouritz, "Review of z-pinned composite laminates," Composites Part A: Applied Science and Manufacturing, vol. 38, No. 12, Dec. 2007, pp. 2383-2397.
Prieto, "Modeling and analysis of crack turning on aeronautical structures," Doctoral Thesis, Universitat Politecnica de Catalunya, Apr. 2007, pp. 83-106.
Seng, "Laminate Design," In: Handbook of Composites, Second Edition, Peters (Ed.), Chapman & Hall, London, 1998, pp. 686-695.
Tomblin et al., "Assessment of Industry Practices for Aircraft Bonded Joints and Structures," U.S. Department of Transportation Federal Aviation Administration Final Report No. DOT/FAA/AR-05/13, Jul. 2005, 245 pages.
Tomblin et al., "Bonded Repair of Aircraft Composite Sandwich Structures," U.S. Department of Transportation Federal Aviation Administration Final Report No. DOT/FAA/AR-03/74, Feb. 2004, 121 pages.
Wang et al., "Optimum Shapes for Minimising Bond Stress in Scarf Repairs," Proceedings of the 5th Australasian Congress on Applied Mechanics (ACAM2007), Dec. 2007, 6 pages.
"Damage-tolerance and fatigue evaluation of structure," U.S. Department of Transporation Federal Aviation Regulation 14 CFR 25.571, Apr. 1998, 3 pages. Accessed May 29, 2012 from http://www.flightsimaviation.com/data/FARS/part_25-571.html.
Office Action, dated Dec. 22, 2011, regarding U.S. Appl. No. 12/400,475, 15 pages.
Final Office Action, dated Jun. 7, 2012, regarding U.S. Appl. No. 12/400,475, 14 pages.
Notice of Allowance, dated Oct. 29, 2012, regarding U.S. Appl. No. 12/400,475, 20 pages.
Office Action dated Jan. 2, 2013, regarding U.S. Appl. No. 12/706,799, 33 pages.
Office Action, dated Jul. 14, 2011, regarding U.S. Appl. No. 12/401,541, 13 pages.
Final Office Action, dated Dec. 16, 2011, regarding U.S. Appl. No. 12/401,541, 10 pages.
Office Action, dated Jul. 24, 2012, regarding U.S. Appl. No. 12/401,541, 18 pages.
Final Office Action, dated Dec. 14, 2012, regarding U.S. Appl. No. 12/401,541, 13 pages.
Office Action, dated Feb. 1, 2012, regarding U.S. Appl. No. 12/400,560, 13 pages.
Final Office Action, dated Jul. 5, 2012, regarding U.S. Appl. No. 12/400,561, 15 pages.
Notice of Allowance, dated Feb. 22, 2013, regarding U.S. Appl. No. 12/400,561, 19 pages.
Office Action, dated Nov. 9, 2012, regarding U.S. Appl. No. 12/903,489, 29 pages.
Office Action, dated Nov. 7, 2013, regarding U.S. Appl. No. 13/902,816, 26 pages.
Office Action, dated May 23, 2013, regarding U.S. Appl. No. 12/903,489, 15 pages.
Final Office Action, dated Mar. 20, 2014, regarding U.S. Appl. No. 13/902,816, 7 pages.
Office Action, dated Jan. 8, 2014, regarding U.S. Appl. No. 13/902,855, 35 pages.
Notice of Allowance, dated May 6, 2016, regarding U.S. Appl. No. 14/085,514, 9 pages.
Notice of Allowance, dated May 24, 2016, regarding U.S. Appl. No. 13/945,475, 7 pages.

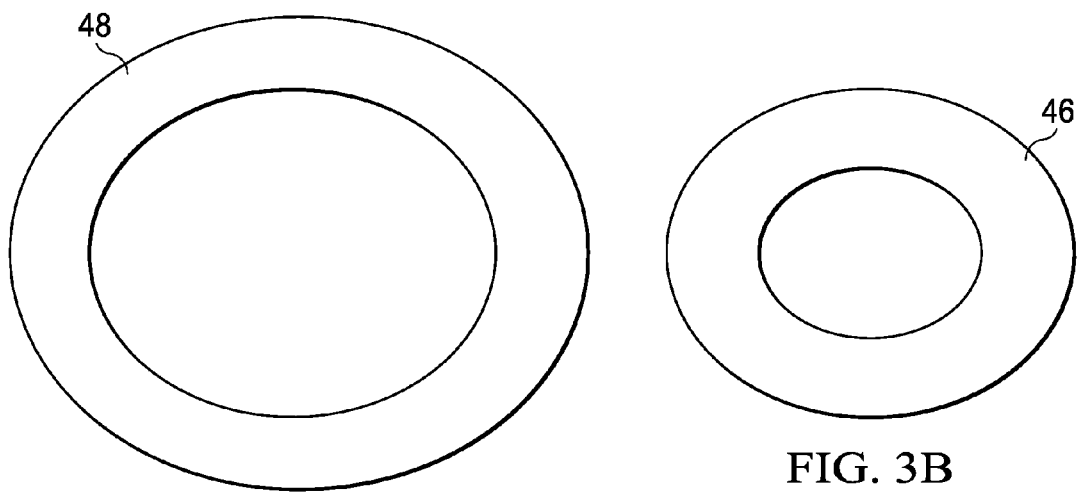
FIG. 3A
FIG. 3B
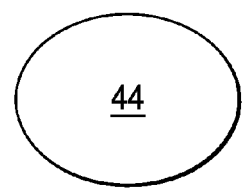
FIG. 3C
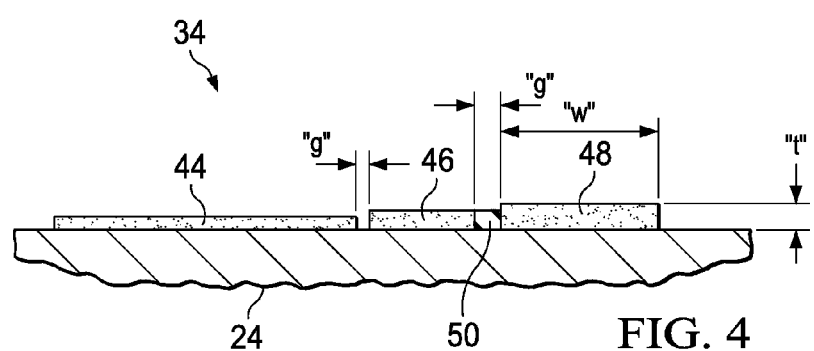
FIG. 4

| PLY NUMBER | THIRD REGION | SECOND REGION | FIRST REGION |
|---|---|---|---|
| 1 | 0 | 0 | 0 |
| 2 | 90 | 90 | 90/+45 |
| 3 | NONE | NONE | -45 |
| 4 | 90 | 0 | 0 |
| 5 | 90 | 0 | 0 |
| 6 | NONE | NONE | -45 |
| 7 | 90 | 90 | 90/+45 |
| 8 | 0 | 0 | 0 |

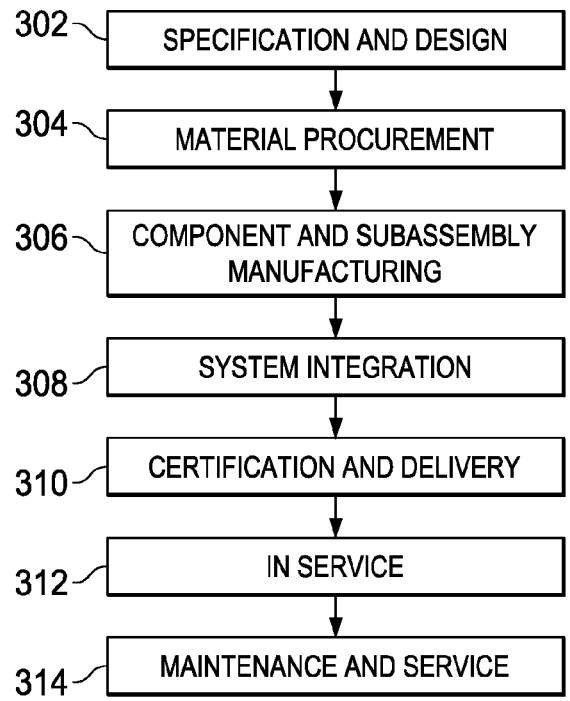
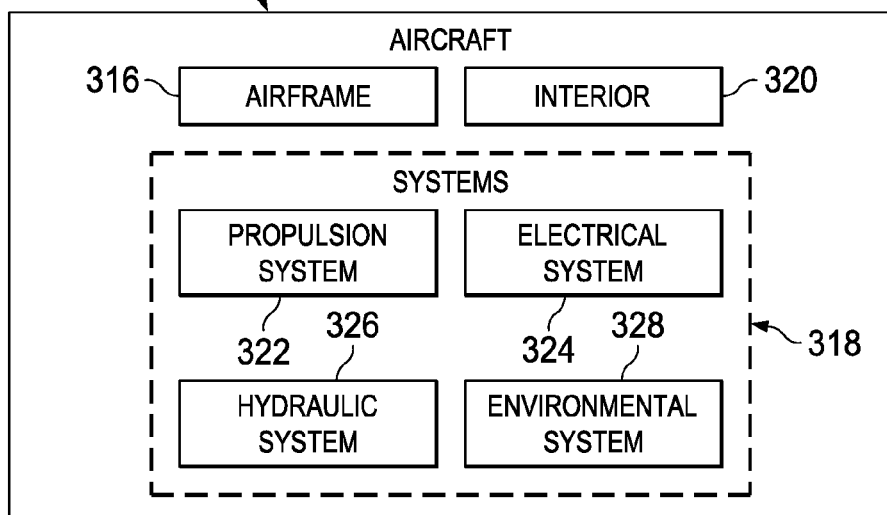

STRUCTURAL BONDED PATCH WITH TAPERED ADHESIVE DESIGN

CROSS REFERENCE TO RELATED APPLICATIONS

This application is a continuation-in-part of U.S. Ser. No. 13/902,816, filed May 26, 2013, entitled "Predictable Bonded Rework of Composite Structures Using Tailored Patches," and published as U.S. Publication No. 2013/0337214; which is a divisional of U.S. Ser. No. 12/400,519, filed Mar. 9, 2009, now U.S. Pat. No. 8,449,703, issued May 28, 2013; the disclosures of which are incorporated by reference herein.

BACKGROUND INFORMATION

1. Field

The present disclosure relates generally to composite structures and, in particular, to reworking composite structures. Still more particularly, the present disclosure relates to a method and apparatus for reworking inconsistent areas of composite structures using a patch with a tapered adhesive design.

2. Background

Composite structures sometimes have localized areas containing one or more inconsistencies that may require rework in order to bring the structure within design tolerances. These inconsistencies may include, for example, without limitation, a crack, delamination, and other types of inconsistencies formed during the lifecycle of a composite structure.

Oftentimes, an inconsistent area of a composite structure is reworked using a patch. This patch may comprise composite materials, metals, or a combination thereof. Different types of techniques may be used to rework the composite structure using the patch.

For instance, a patch may be placed over the inconsistent area and secured to the parent structure using mechanical fasteners. The condition of the patch may be monitored over time by visually inspecting the fasteners.

In other cases, a rework patch may be secured to a parent structure using a bonded joint. This technique may also require the use of mechanical fasteners that provide secondary load paths forming an arrestment mechanism to limit the growth of an inconsistency.

These types of patching techniques, however, may not perform as desired when the composite structure is an aircraft structure. For example, the use of fasteners may increase aircraft weight, drag on the aircraft, or both more than desired. As another example, a bonded patch may not reduce the spread of the inconsistency in a desired manner. Therefore, it would be desirable to have a method and apparatus that take into account at least some of the issues discussed above, as well as other possible issues.

SUMMARY

Embodiments of the disclosure provide a method and apparatus for reworking an inconsistent area of a structure. The structure may take the form of a composite structure used in aircraft. In some cases, the structure also may be a metal structure.

A patch is bonded to the inconsistent area of the structure. The patch has two or more regions with different structural properties. Tapered adhesive sections are positioned between the patch and the structure. These tapered adhesive sections have different structural properties as well. For example, the tapered adhesive sections may have different kinematic constants, elastic constants, constitutive constants, inter-laminar fracture toughness, or a combination thereof.

Both the patch regions and the tapered adhesive sections may be tailored to reduce the strain energy release rate at the inconsistent boundary area more efficiently than patches using fasteners or bonded joints without tapered adhesive sections. Propagation of a crack may be reduced or eliminated. In this manner, the patch with the tapered adhesive sections substantially increases the damage tolerance and durability of the structure throughout the lifecycle of the aircraft. As a result, the tapered adhesive increases the lifetime of the patch and reduces the frequency of rework on the inconsistent area.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 3, 3A, 3B, and 3C are illustrations of a plan view of an adhesive layer in accordance with an illustrative embodiment;

FIG. 4 is an illustration of a sectional view of an adhesive layer in accordance with an illustrative embodiment;

FIG. 27 is an illustration of a block diagram of an aircraft manufacturing and service method in accordance with an illustrative embodiment; and FIG. 28 is an illustration of a block diagram of an aircraft in which an illustrative embodiment may be implemented.

DETAILED DESCRIPTION

The illustrative embodiments recognize and take into account one or more different considerations. For example, the illustrative embodiments recognize and take into account that it may be desirable to reduce or eliminate the extension of an inconsistency in an aircraft structure. As an example, the illustrative embodiments recognize and take into account that it may be desirable to provide a patch for an inconsistent area on a composite aircraft structure that does not disbond during the operational life of the aircraft. In this illustrative example, "disbond" may refer to separation of the patch at the bond joint between the patch and the underlying composite structure.

The illustrative embodiments further recognize and take into account that it may be desirable to reduce stresses in the patch, the composite structure, or both to substantially prevent the inconsistency from extending within the composite structure. For example, without limitation, the illustrative embodiments recognize and take into account that it may be desirable to design the patch and the underlying adhesive layers to release strain energy in a desired manner to substantially prevent a crack from extending through the composite structure.

Thus, the illustrative embodiments provide a method and apparatus for reworking a structure. The structure may be a composite structure for an aircraft. An apparatus comprises a composite rework patch and a plurality of adhesive layers. The composite rework patch includes a first side having a contour conforming to an inconsistent area on a composite structure. The composite rework patch comprises a plurality of regions having different structural properties. The plurality of adhesive layers is located on the first side of the patch. The plurality of adhesive layers change in thickness within at least one region of the composite rework patch to form tapered adhesive sections.

Figure 1:
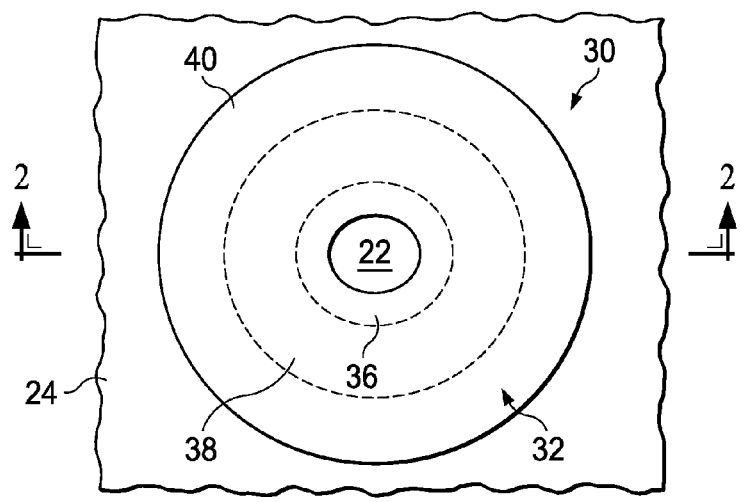
FIG. 1 is an illustration of a bonded rework patch on a composite structure in accordance with an illustrative embodiment.
Figure 2:
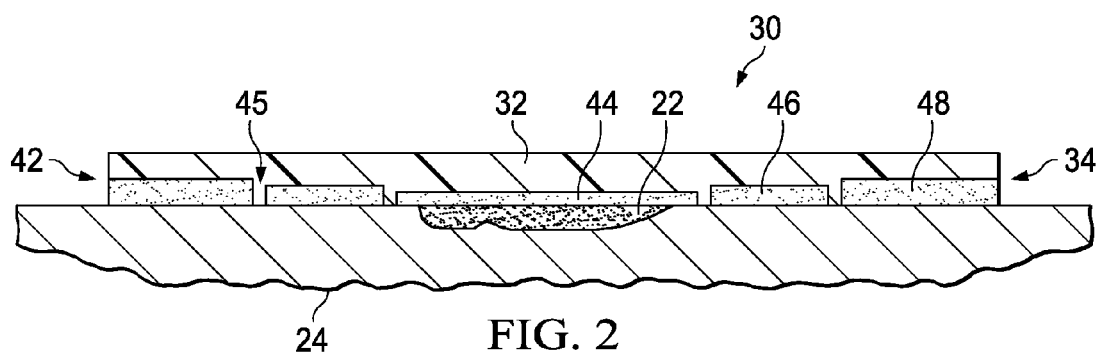
FIG. 2 is an illustration of a sectional view of a bonded rework patch on a composite structure in accordance with an illustrative embodiment.

Referring now to the figures and, in particular, to FIGS. 1 and 2. According to the disclosed embodiments, a composite rework patch 30 is used to rework an inconsistent area 22 in a composite structure 24. As used herein, "inconsistent area", "inconsistency" and "inconsistencies" each refer to a localized area in the composite structure 24 that may be outside of designed tolerances. The inconsistent area 22 may comprise, for example, without limitation, a void, a dent, or a porosity that may occur at the time that the composite structure 24 is manufactured, or later during the service life of the composite structure 24.

The composite rework patch 30 comprises a laminate layer 32 which overlies the inconsistent area 22 and is bonded to the composite structure 24 by an adhesive layer 34 comprising a structural adhesive forming a bond joint 42. The size of the composite rework patch 30 may vary with the application and the dimensions of the inconsistent area 22.

The adhesive layer 34 divides the bond joint 42 and the inconsistent area 22 into first, second and third control regions 36, 38, 40, respectively, that may provide a graceful reduction of transition loads transmitted between the composite structure 24 and the composite rework patch 30. The first control region 36 is centrally located over the inconsistent area 22, and the second and third control regions 38, 40 may respectively comprise a pair of substantially concentric rings surrounding the centrally located first control region 36.

Figure 22:
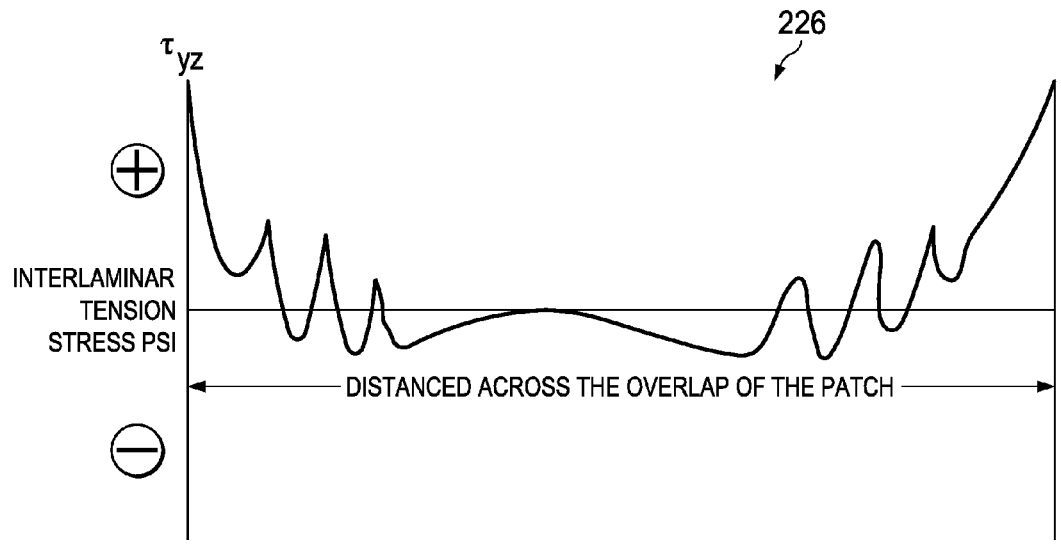
FIG. 22 is an illustration of a graph of the out-of-plane inter-laminar tension stress inside a bonded patch in accordance with an illustrative embodiment.

While the control regions 36, 38, 40 are shown as being generally circular in an illustrative embodiment, a variety of other shapes may be formed. Also, in other embodiments, the composite rework patch 30 may have only two control regions, or may have more than three control regions, as shown in FIG. 22.

The first control region 36 may exhibit favorable in-plane adhesive stresses. The second control region 38 may be referred to as a "durability region" and any disbond within this region between the laminate layer 32 and the composite structure 24 may need to be evaluated and quantified in order to determine whether rework should be performed. The third control region 40, which may be dominated by in-plane shear and peeling moments, may affect the behavior of the entire structural bond between the laminate layer 32 and the composite structure 24.

Figure 3:
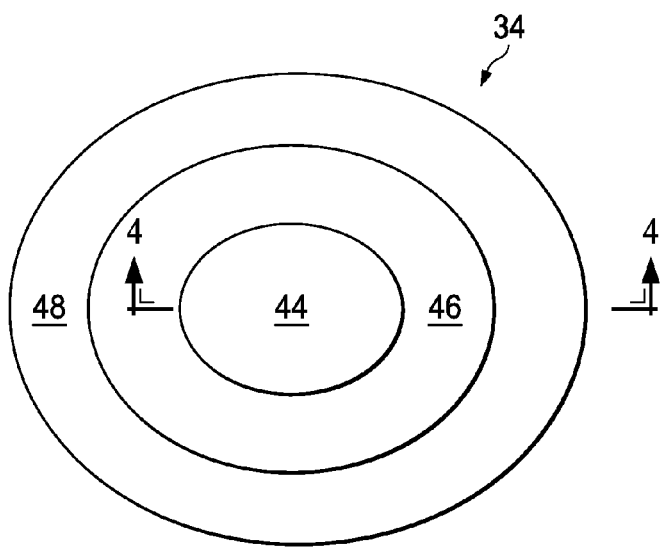

Referring now particularly to FIGS. 2-4, the adhesive layer 34 may comprise a central first adhesive section 44 surrounded by concentric ring shaped second and third adhesive sections 46 and 48. The size and shape of the first, second, and third adhesive sections 44, 46, 48 generally correspond to the first, second, and third control regions 36, 38, 40, respectively, of the composite rework patch 30. Each of the first, second, and third adhesive sections 44, 46, 48 may comprise one or more plies of a commercially available structural adhesive which is generally available in film or sheet form that may be cut to the desired shape.

The first, second, and third adhesive sections 44, 46, 48 may also be formed from a commercially available structural adhesive paste. As previously noted, multiple plies (not shown), or layers, of the adhesive sheet material may be built up to form a desired thickness "t" for each of the first, second, and third adhesive sections 44, 46, 48. The strength of the bond may be tailored using the thickness "t" between the laminate layer 32 and the composite structure 24. In some applications only a single ply of adhesive sheet material may be required, while in other applications, more than one ply may be necessary, depending on the application and the thickness of the adhesive sheet.

In one embodiment, circumferential gaps "g" may be formed between first, second, and third adhesive sections 44, 46, 48 to aid in arresting the growth of potential disbonding between the laminate layer 32 and the composite structure 24. A filler 50 may be placed in one or both of the gaps "g" to aid in the arrestment.

The properties of each of the first, second, and third adhesive sections 44, 46, 48 may be tailored in a manner that affects the rate at which first, second, and third control regions 36, 38, 40 of the bond joint 42, respectively, release strain energy. Tailoring of each of the first, second, and third adhesive sections 44, 46, 48 may be achieved by altering the dimensions of the first, second, and third adhesive sections 44, 46, 48, respectively, such as thickness "t" or width "w", or by altering the form of the film, paste, scrim, etc., as well as by altering the structural properties of the adhesive layer, such as fracture toughness, peel or shear properties, or by providing the gap "g" between the first, second, and third adhesive sections 44, 46, 48. Additionally, a spacer or the filler 50 may be interposed between first, second, and third adhesive sections 44, 46, 48 to aid in arresting disbond growth.

The use of the tailored first, second, and third adhesive sections 44, 46, 48 may result in a bonded composite rework patch 30 that is divided into multiple control regions 36, 38, 40 that respectively release strain energy at different rates. The first, second, and third control regions 36, 38, 40 provide for a graceful reduction of transition loads between the patch 30 and the composite structure 24, which may not only allow prediction of a course of disbond extension, but can allow assessment of the condition of the composite rework patch 30 through simple visual inspection, or other non-destructive inspection techniques. Although three control regions are shown and discussed, more or less than three control regions may be present.

The first control region 36 of the composite rework patch 30 which overlies the inconsistent area 22 exhibits favorable in-plane stresses that may suppress the stress concentration around the boundary of a disbond of the bond joint 42. The global adhesive stresses within the first control region 36 may reduce the strain energy release rate necessary for extension of a disbond under maximum load limits applied to the composite structure 24.

The characteristics of the composite rework patch 30 within the second control region 38 may result in the release of strain energy at a rate greater than that of the first control region 36. Any disbond that may occur in the bond joint 42 within the second control region 38 may be anticipated by a fatigue durability disbond curve (not shown) which defines the work input required to initiate disbond growth. The characteristics of the third control region 40 are selected such that the strain energy release rate within the third control region 40 is greater than that of the second control region 38 to discourage disbond initiation and growth, as well as in-plane shear and peeling moments.

Figure 5:
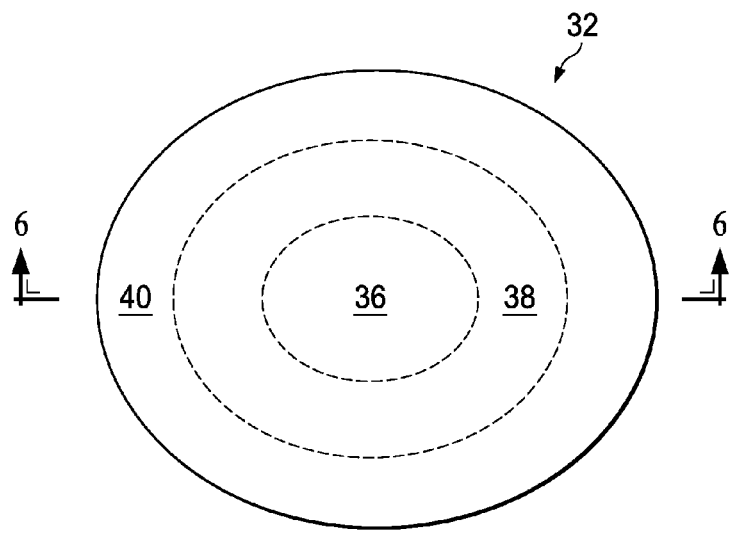
FIG. 5 is an illustration of a plan view of a composite rework patch forming part of a rework patch in accordance with an illustrative embodiment.
Figure 6:
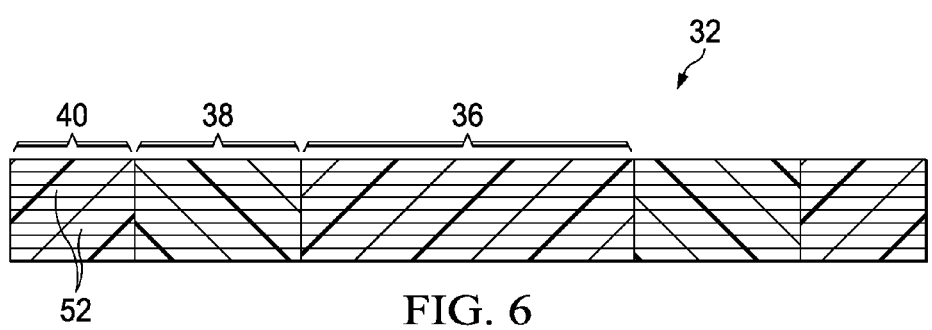
FIG. 6 is an illustration of a sectional view of a composite rework patch forming part of a rework patch in accordance with an illustrative embodiment.

Attention is now directed to FIGS. 5 and 6 which illustrate a laminate layer 32 comprising multiple plies 52 of fiber reinforced polymer in which the plies 52 may be tailored in order to aid in achieving first, second, and third control regions 36, 38, 40, respectively, having the desired strain energy release rates.

The strain energy release rate within the laminated layer 32 may be tailored within the control regions 36, 38, 40 by selecting the plies, arranging the plies, or both such that the plies in each of the first, second, and third control regions 36, 38, 40 have different characteristics. In other words, each of the first, second, and third control regions 36, 38, 40 may have ply characteristics that are unique to that region.

For example, without limitation, the plies in the second control region 38 may have characteristics that are different from those in the first or third control regions 36 or 40, and the plies in the first control region 36 may have characteristics that are different than those in the second and third control regions 38 and 40. As used herein, "characteristics" and "ply characteristics" refer to, for example, without limitation, at least one of the type, size, or quantity of fiber reinforcement in a ply, ply thickness, gaps between the plies, materials, elements or structures placed between the plies, the number of plies, the type or density of matrix used in the ply, the layup orientation (angle) of each ply, the sequence of ply orientations in a stack of the plies, or other characteristics.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The strain energy release rate within one or more of the first, second, and third control regions 36, 38, 40 may be tailored by forming a scarf or tapered joint (not shown) between the laminate layer 32 and the composite structure 24. The strain energy release rate may also be tailored by providing gaps (not shown) in certain areas between the plies 52 in a manner that may alter the mechanical properties of the laminate layer 32 in each of the first, second, and third control regions 36, 38, 40.

Also, differing orientation sequences of the plies 52 may be desirable in order to aid in achieving the defined first, second, and third control regions 36, 38, 40. Orientation refers to the layup angle or direction of reinforcing fibers in a ply from a central axis of the ply. For example, without limitation, the angles of the reinforcing fibers in each region may be selected from one of 0°, 30°, 60°, 90°, 0°, +45°, −45°, 90, and other suitable angles.

In the example illustrated in FIGS. 5 and 6, the materials used in the plies 52, the orientation sequences of plies 52, or both within the first control region 36 result in the highest rate of strain relief. Selection of these materials, ply orientation sequences, or both in second control region 38 and third control 40 result in intermediate and lowest rates of release of strain energy, respectively. In other embodiments, depending on the application, the third control region 40 may possess the highest rate of strain energy relief, while the first control region 36 possess the lowest rate of strain energy relief. In other words, plies 52 in each region may be configured in a different manner than shown herein.

Figures 7, 8:
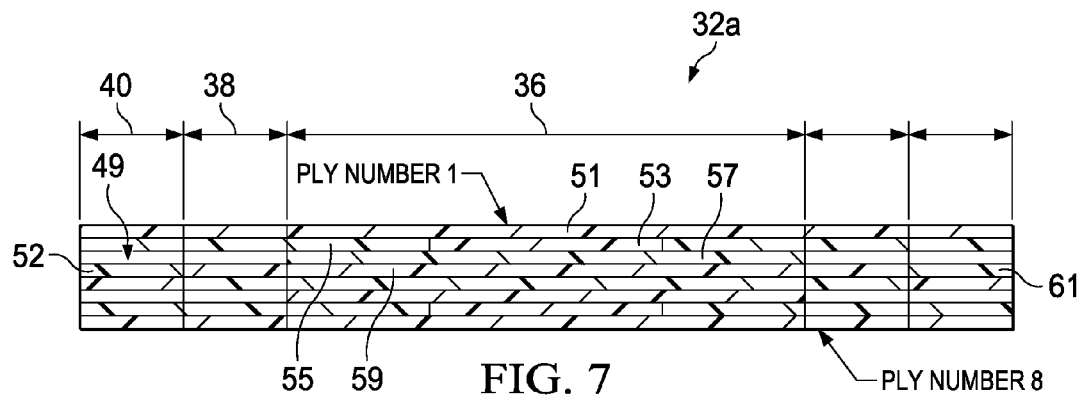
FIG. 7 is an illustration of a sectional view of a tailored laminate patch divided into regions having differing inter-laminar toughness in accordance with an illustrative embodiment.
FIG. 8 is an illustration of a table showing a ply schedule for differing regions of a tailored laminate patch in accordance with an illustrative embodiment.

Attention is now directed to FIG. 7 which illustrates a typical tailored laminate patch 32a comprising eight plies 52 of fiber reinforced polymer, before being compacted and cured into a consolidated laminate. When viewed in plan, the shape of the tailored laminate patch 32a, including the first, second, and third control regions 36, 38, 40, may be substantially the same as that of the composite rework patch 32 illustrated in FIG. 5. The plies 52 forming the tailored laminate patch 32a may be referred to as plies #1-#8. FIG. 8 is a table illustrating the ply orientations for the laminate patch 32a within the first, second, and third control regions 36, 38, 40 for each of the plies #1-#8, while FIGS. 9-12 show the constituent sections of plies 1-4.

As mentioned above in connection with FIGS. 5 and 6, the characteristics of the plies 52 may be different in each of the first, second, and third control regions 36, 38, 40. The rate of release of strain energy in the first, second, and third regions 36, 38, and 40 is related to the modulus or stiffness that defines the inter-laminar toughness of the tailored laminate patch 32a in the respective first, second, and third control regions 36, 38, 40.

In the illustrative example, the first control region 36 has the highest inter-laminar fracture toughness, while the third control region 40 has the lowest inter-laminar fracture toughness. In a depicted example, the inter-laminar fracture toughness of the third control region 40 may be between approximately 0.5 and 1.0 in-#/in$^2$. The inter-laminar fracture toughness of the second control region 38 may be between approximately 1.5 and 2.0 in-#/in$^2$. The first control region 36 may have an inter-laminar fracture toughness equal to or greater than approximately 2.5 in-#/in$^2$.

In other illustrative examples, however, the third control region 40 may have the highest inter-laminar fracture toughness and the first control region 36 may have the lowest inter-laminar fracture toughness. In this case, the inter-laminar fracture toughness of the second control region 38 may be between that of the first and third control regions 36, 40, respectively.

The particular values of the inter-laminar fracture toughness for the first, second, and third control regions 36, 38, 40 will depend upon the application and the particular mechanical properties of the plies 52 that are present within the first, second, and third control regions 36, 38, 40. Moreover, the values for the inter-laminar fracture toughness within the first, second, and third control regions 36, 38, 40 may be tailored to the properties of the adhesive layer 34 as shown in FIGS. 3, 3A, 3B, and 3C. For instance, the patch may be configured such that the mechanical properties of sections 44, 46, 48 of the adhesive layer 34 and the mechanical properties of the tailored laminate patch 32a within the first, second, and third control regions 36, 38, 40 are suitably matched to provide maximum performance. Although not shown in FIG. 7, the first, second, and third adhesive sections 44, 46, 48 of the adhesive layer 34, respectively, underlie and may be substantially coextensive with the first, second, and third control regions 36, 38, 40 of the laminate patch 32a.

As previously discussed, the inter laminar fracture toughness within the first, second, and third control regions 36, 38, 40 may be controlled by using differing prepreg materials in the plies 52, by overlapping the plies 52 between adjacent ones of the first, second, and third control regions 36, 38, 40, by using different ply orientation sequences within each of the first, second, and third control regions 36, 38, 40, or a combination thereof. For example, FIG. 8 illustrates differing ply orientation sequences for plies #1-#8 within each of the first, second, and third control regions 36, 38, 40.

It can be seen, for example, that in comparing the orientation sequences of the plies 52 for the second and third control regions, 38, 40 respectively, ply #4 and ply #5 are oriented at 90° in the third control region 40, but have a 0° orientation in the second control region 38. As previously mentioned, ply orientation refers to the direction of orientation of unidirectional reinforcing fibers held in a polymer matrix, usually a prepreg, which forms each of the plies 52. The sequence of orientations of plies #1-#8 for the first control region 36 is different from the sequence of orientations for either the second or third control regions, 38, 40.

Figure 9:
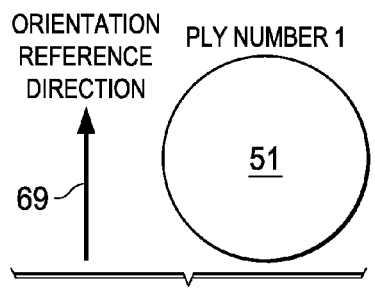
FIG. 9 is an illustration of a plan view illustrating plies in a laminate patch in accordance with an illustrative embodiment.
Figure 10:
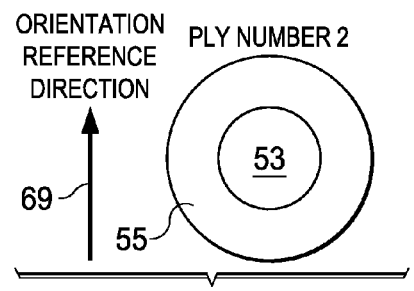
FIG. 10 is an illustration of a plan view illustrating plies in a laminate patch in accordance with an illustrative embodiment.
Figure 11:
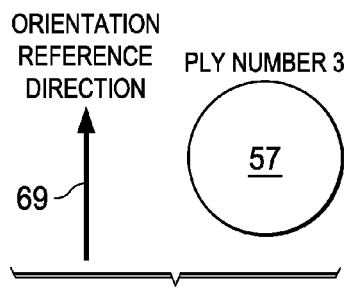
FIG. 11 is an illustration of a plan view illustrating plies in a laminate patch in accordance with an illustrative embodiment.
Figure 12:
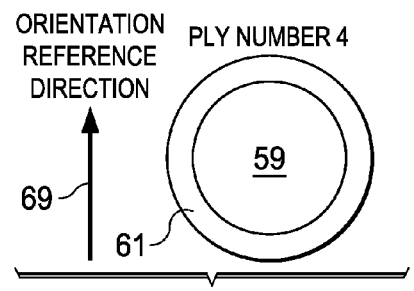
FIG. 12 is an illustration of a plan view illustrating plies in a laminate patch in accordance with an illustrative embodiment.

Referring now FIGS. 7 and 9-12, ply #1 comprises a single, circularly shaped section 51, as shown in FIG. 9, having a 0° degree fiber orientation relative to an orientation reference direction 69, which extends across all of the first, second, and third control regions 36, 38, 40. Ply #2 includes a circular center section 53, shown in FIG. 10, having a +45° fiber orientation. Ply #2 also has an outer ring shaped section 55 having a 90° fiber orientation. As a result of the configuration of ply #2, the control region 36 has combined fiber orientations of 90° and +45° degrees, while the control regions 38 and 40 both have 90° fiber orientations.

Ply #3 comprises a single section 57 (FIG. 11) within first control region 36 having a −45° fiber orientation, while in the second and third control regions 38 and 40, gaps 49 (FIG. 7) are present. Finally, ply #4 (FIG. 12) comprises a section 59 having a 0° fiber orientation that extends throughout the first and second control regions 36, 38. Section 59 is surrounded by a section 61 having a 90° fiber orientation which is confined to the third control region 40. Plies #5-8, shown in FIG. 7, are essentially a mirror image of plies #1-4, described above.

In this illustrative example, each of the first, second, and third control regions 36, 38, 40 possesses a different inter-laminar fracture toughness in the tailored laminate patch 32a, the bond joint 42, or both (FIG. 2). The inter-laminar fracture toughness within the first, second, and third control regions 36, 38, 40 of the tailored laminate patch 32a may be configured to compliment the global adhesive stresses in the bond joint 42 so as to contain and resist growth of inconsistencies either in the tailored laminate patch 32a or the bond joint 42.

Figure 13:
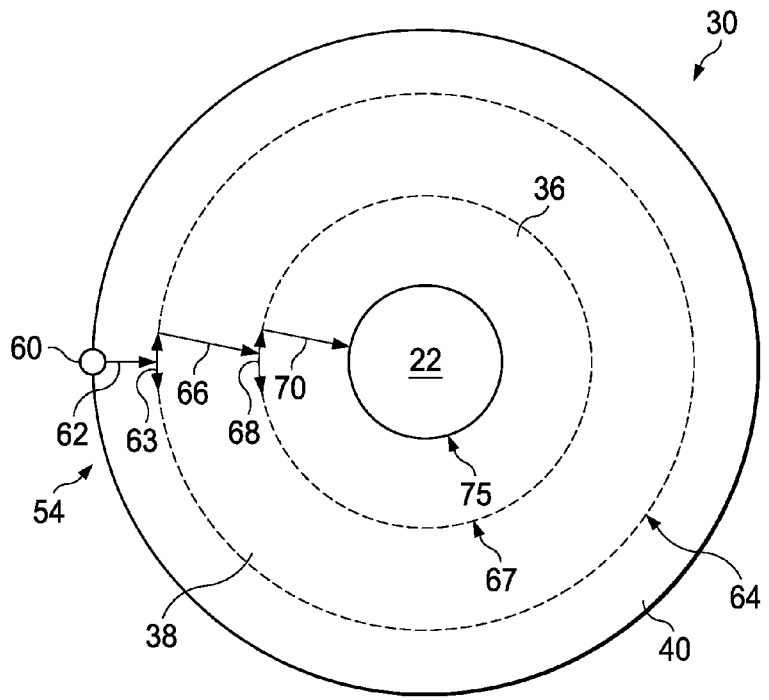
FIG. 13 is an illustration of a plan view of a rework patch illustrating a typical propagation path of a disbonding in accordance with an illustrative embodiment.

FIG. 13 illustrates the manner in which a disbond beginning at point 60 at the outer edge of the third control region 40 and growing inwardly may be arrested. The disbond beginning at outer edge 54 may be illustrated in this example as growing directly inward, as shown in the direction of arrow 62, until the boundary 64 is reached between the second and third control regions 38, 40. As a result of at least one of the difference in materials in the first, second, and third control regions 36, 38, 40, the presence of a gap "g" or filler 50 (FIG. 4), or the difference in the adhesive properties of the first, second, and third adhesive sections 44, 46, 48 of the adhesive layer 34 (FIG. 2), the disbond is arrested and may move circumferentially, as shown in the direction of arrow 63, around the boundary 64 of the third control region 40.

In another illustrative example, the disbond may progress from the third control region 40 and into the second control region 38, then progress inward toward the first control region 36, as indicated by arrow 66. When the progression of the disbond reaches the boundary 67 between the first and second control regions 36, 38, it is arrested and may move circumferentially around the boundary 67 as indicated by arrow 68.

Figure 14:
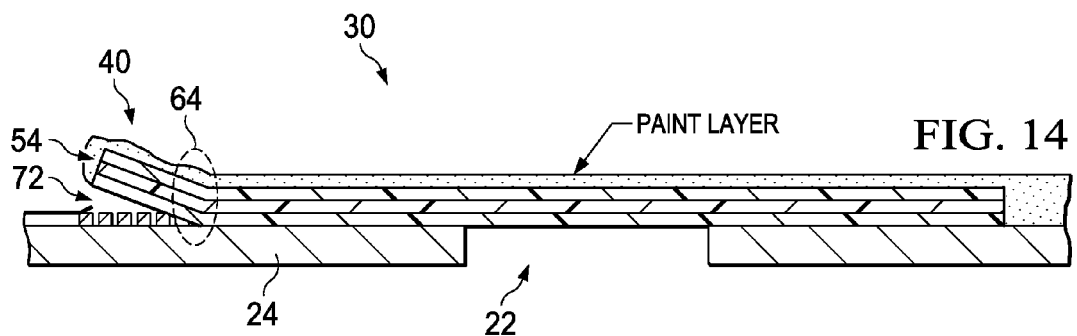
FIG. 14 is an illustration of a sectional view showing a progression of disbonding through regions of a patch in accordance with an illustrative embodiment.

Referring to FIGS. 13 and 14, as the disbond 72 moves inward from point 60, the outer edge 54 of the composite rework patch may peel upward. This peeling may result in cracking a portion of the overlying paint (not shown), which provides a visual indication of disbond initiation or growth within the third control region 40. This visual indication of a disbond may terminate at the boundary 64 between the second and third control regions 38, 40.

Figure 15:
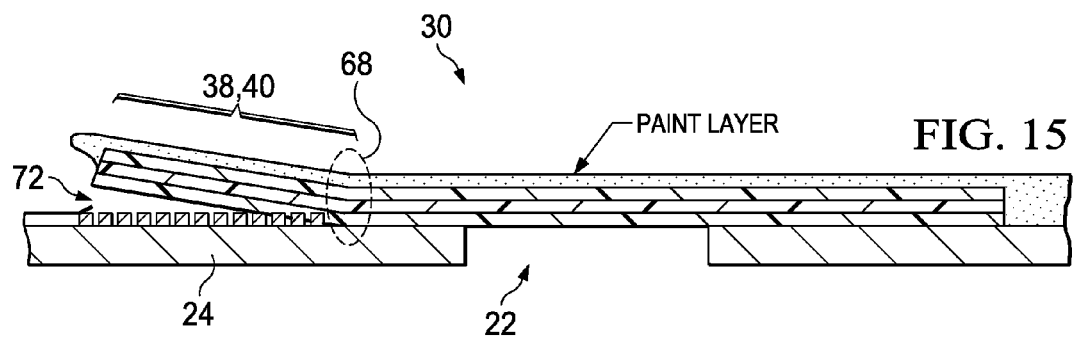
FIG. 15 is an illustration of a sectional view showing a progression of disbonding through regions of a patch in accordance with an illustrative embodiment.

As shown in FIG. 15, if the disbond 72 continues into the second control region 38 toward the boundary 67, the composite rework patch 30 in the area of the second and third control regions 38, 40 may peel upward. The overlying paint may be further cracked and provide a visual indication that the disbond 72 has progressed into or through the second control region 38.

Figure 16:
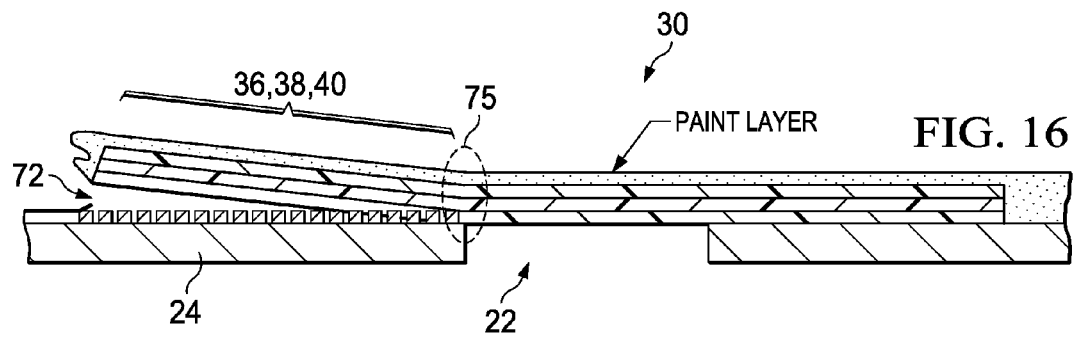
FIG. 16 is an illustration of a sectional view showing a progression of disbonding through regions of a patch in accordance with an illustrative embodiment.

FIG. 16 illustrates the disbond 72 having progressed up to the boundary 75 of the inconsistent area 22. At this point, the areas of the composite rework patch 30 and all three of the first, second, and third control regions 36, 38, 40 may peel upward to further crack overlying paint. This action provides an even more obvious visual indication that the disbond has advanced to a point where the composite rework patch 30 may need rework.

In this illustrative example, the first, second, and third control regions 36, 38, 40 of the composite rework patch 30 provide a means of allowing nondestructive visual inspection of the condition of the composite rework patch 30, including the bond joint 42 between the composite rework patch 30 and the composite structure 24. In other illustrative examples, other non-destructive inspection techniques may be used to assess the condition of the composite rework patch 30 in addition to, or in place of, visual inspection.

Figure 17:
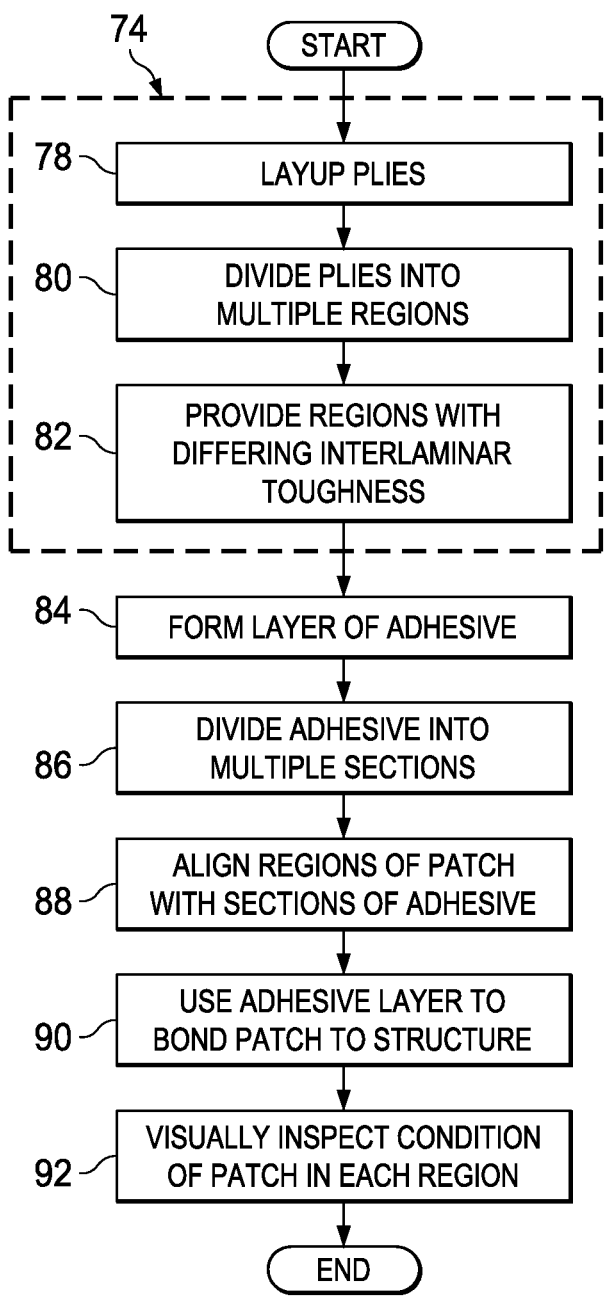
FIG. 17 is an illustration of a flowchart of a process for reworking areas of a composite structure containing inconsistencies using a patch in accordance with an illustrative embodiment.

FIG. 17 illustrates a flowchart of a process for reworking areas of a composite structure containing inconsistencies using a patch. The patch used may be tailored rework patch 32a shown in FIG. 7. The laminate layer is formed by a series of steps 74 beginning with laying up plies at step 78 using a ply schedule and orientation sequence that may be similar to those shown in FIGS. 7 and 8.

As shown at step 80, the plies are divided into multiple regions as part of the ply layup from step 78. Also, the regions are provided with differing inter-laminar fracture toughness as shown at step 82, by using differing materials and/or ply orientations as previously discussed.

At step 84, a layer of adhesive is formed, and at step 86, the adhesive layer is divided into multiple sections. The regions are then aligned, as shown at step 88, with the sections of the adhesive layer. The adhesive layer is used to bond the patch to a structure, as shown at step 90. At step 92, the patch may be visually inspected over time to determine the condition of the patch in each of the regions.

Figure 18:
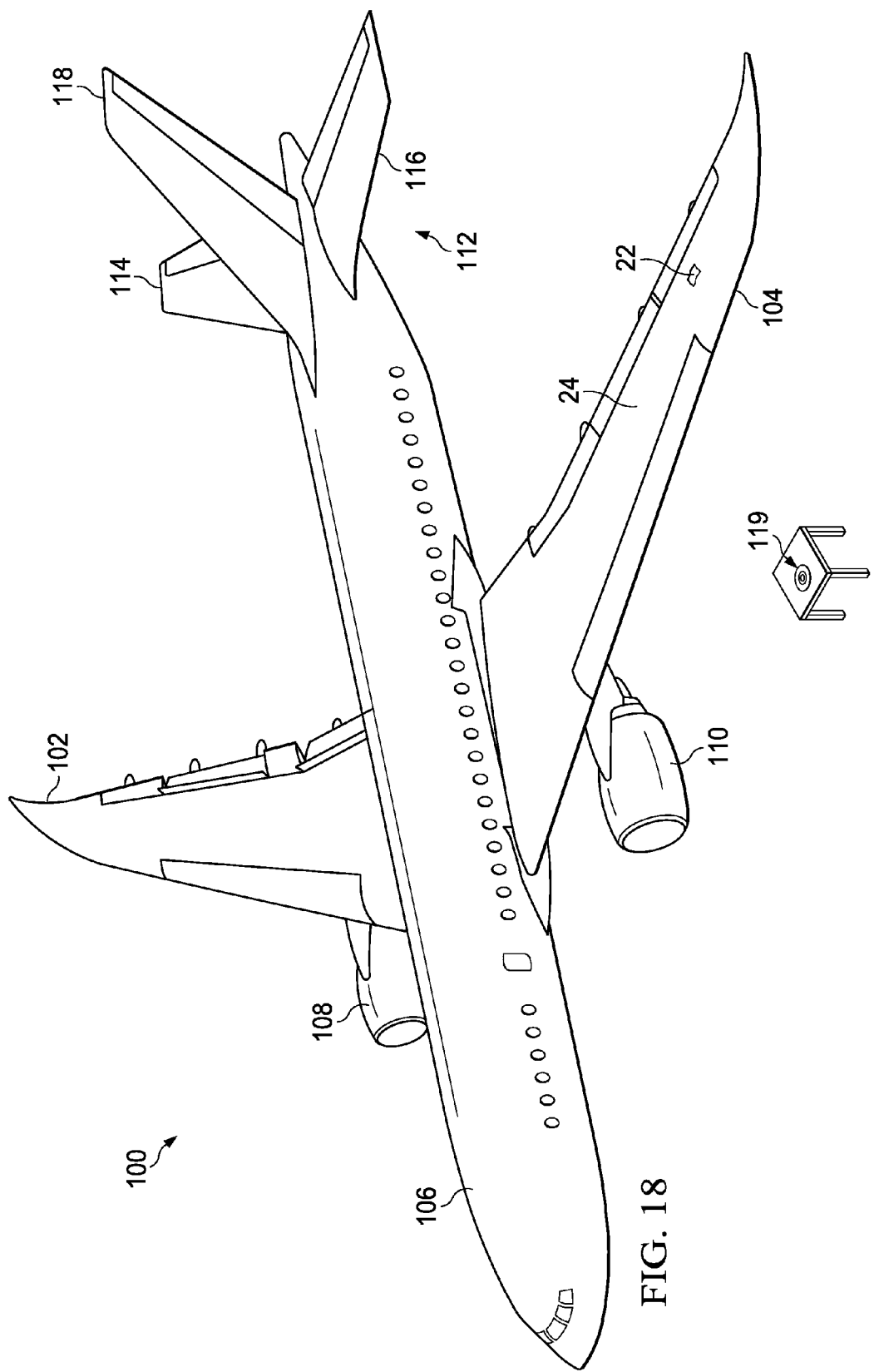
FIG. 18 is an illustration of an aircraft in accordance with an illustrative embodiment.

With reference to FIG. 18, an illustration of an aircraft is depicted in accordance with an illustrative embodiment. In this illustrative example, an aircraft 100 has a wing 102 and a wing 104 attached to a body 106. The aircraft 100 includes an engine 108 attached to the wing 102 and an engine 110 attached to the wing 104.

The body 106 has a tail section 112. A horizontal stabilizer 114, a horizontal stabilizer 116, and a vertical stabilizer 118 are attached to the tail section 112 of the body 106.

In this illustrative example, the wing 104 includes the composite structure 24. The composite structure 24 takes the form of a composite skin panel in this illustrative example. As shown, the inconsistent area 22 is present in the composite structure 24 on the wing 104.

In this depicted example, the composite rework patch 119 is used to patch the inconsistent area 22. The composite rework patch 119 includes a first control region, a second control region, and a third control region. The composite rework patch 119 also includes tapered adhesive sections (not shown in this view). These tapered adhesive sections are positioned between the composite rework patch 119 and the inconsistent area 22 to bond the composite rework patch 119 to the inconsistent area 22 to reduce forces acting on the inconsistent area 22 during operation of the aircraft 100.

Figure 19:
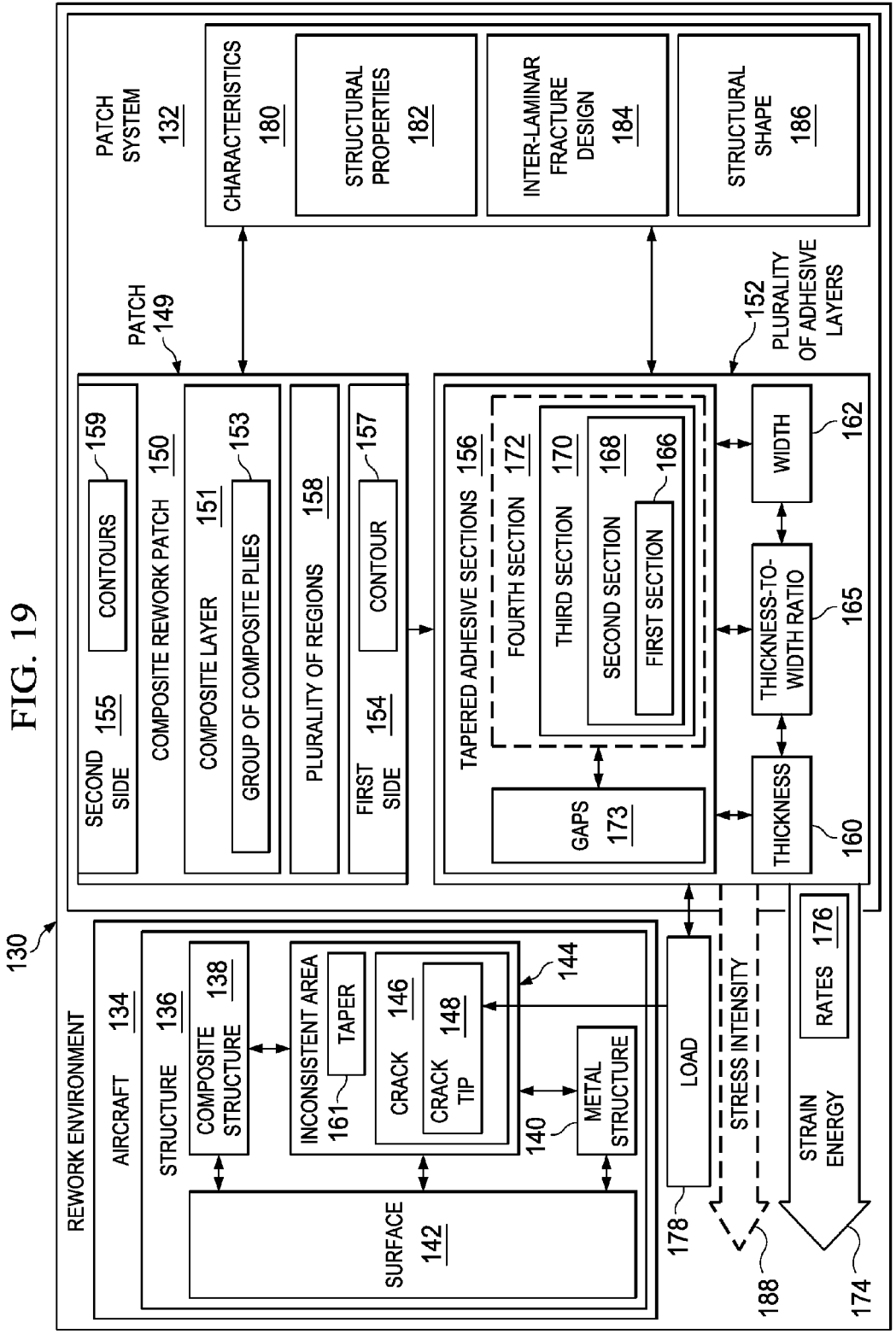
FIG. 19 is an illustration of a block diagram of a rework environment in accordance with an illustrative embodiment.

With reference to FIG. 19, an illustration of a block diagram of a rework environment is depicted in accordance with an illustrative embodiment. In this depicted example, a rework environment 130 is an environment in which a patch system 132 may be used to rework portions of an aircraft 134.

The aircraft 100 shown in FIG. 18 is an example of a physical implementation for the aircraft 134 shown in this figure. Composite rework patch 30 shown in FIGS. 1-16 and composite rework patch 119 shown in FIG. 18 are examples of implementations for the patch system 132 in this figure.

As depicted, the patch system 132 is used to rework a structure 136 in the aircraft 134. The structure 136 may take various forms in this illustrative example. For instance, the structure 136 may be a composite structure 138, a metal structure 140, or take the form of another type of structure in the aircraft 134. Specifically, the structure 136 in aircraft 134 may be selected from one of a control structure surface, a structural skin panel, a wing structure, a structural empennage, and other suitable types of structures.

In this depicted example, the structure 136 has a surface 142. The surface 142 faces the exterior of the aircraft 134 in this illustrative example.

An inconsistent area 144 is present in the structure 136. Inconsistent area 22 shown in FIGS. 1-16 and FIG. 18 is an example of an implementation for the inconsistent area 144 shown in block form in this figure. In some illustrative examples, the inconsistent area 144 may extend beneath the surface 142 into the structure 136, through additional structures connected to the structure 136, or both.

As shown, the inconsistent area 144 includes a crack 146. The crack 146 is a separation in the structure 136. Other inconsistencies may be present in the inconsistent area 144 in addition to or in place of the crack 146 in other illustrative examples.

In this illustrative example, the crack 146 has a crack tip 148 on each end of the crack 146. It may be desirable to substantially prevent the crack 146 from extending within the crack boundary in surface 142 of the structure 136. In particular, it may be desirable to substantially prevent the crack tip 148 on each end of the crack 146 from extending further along the surface 142 of the structure 136.

In this depicted example, the patch system 132 may be used to rework the inconsistent area 144 and substantially prevent the extension of the crack 146. The patch system 132 includes a number of different components. As used herein, a "number of" items may be one or more items. For example, a number of components means one or more components.

As illustrated, the patch system 132 includes a patch 149. The patch 149 is a structure configured to be positioned over the inconsistent area 144 and bonded to the inconsistent area 144 using a plurality of adhesive layers 152. The patch 149 may include various materials such as a metal, a composite material, and other suitable materials.

As shown, the patch 149 takes the form of a composite rework patch 150 configured to be bonded to the composite structure 138 using the plurality of adhesive layers 152. In this illustrative example, the composite rework patch 30 in FIGS. 1-16 is an example of an implementation for the composite rework patch 150 in this figure.

In this depicted example, the composite rework patch 150 has a composite layer 151. The composite layer 151 may comprise a group of composite plies 153. Plies 52 in the laminate layer 32 shown in FIG. 7 may be an example of an implementation for the composite layer 151 with the group of composite plies 153.

As used herein, a "group" of items means one or more items. For instance, the group of composite plies 153 includes one or more composite plies.

In this illustrative example, the composite rework patch 150 includes a first side 154 and a second side 155. The second side 155 is opposite the first side 154. In this illustrative example, the first side 154 of the composite rework patch 150 faces inward toward the structure 136 and is connected to the tapered adhesive sections 156. The first side 154 of the composite rework patch 150 may have a contour 157 conforming to the inconsistent area 144 on the structure 136.

The second side 155 of the composite rework patch 150 faces outward toward the environment around the structure 136. The second side 155 of the composite rework patch 150 may have different contours 159, depending on the particular implementation. In some cases, when bonded to the structure 136, the second side 155 of the composite rework patch 150 may be substantially parallel to the surface 142 of the structure 136.

In other examples, the second side 155 substantially conforms to a taper 161 in the inconsistent area 144 of the structure 136. In other words, the second side 155 may conform to the taper 161 instead of being substantially parallel to the surface 142 once the composite rework patch 150 is bonded to the structure 136. The taper 161 may be a result of scarf repair operations being performed on structure 136 prior to the application of the patch system 132.

As depicted, the composite rework patch 150 comprises a plurality of regions 158. First, second, and third control regions 36, 38, and 40 shown in FIG. 1 are examples of implementations for the plurality of regions 158.

In this illustrative example, the plurality of adhesive layers 152 is positioned on the first side 154 of the composite rework patch 150. Specifically, a number of adhesive layers are positioned within each of the plurality of regions 158 of the composite rework patch 150. The plurality of adhesive layers 152 may have different configurations corresponding to each of the plurality of regions 158.

The plurality of adhesive layers 152 may comprise a film adhesive in this illustrative example. The film adhesive may take the form of a tape or a sheet that is placed on the inconsistent area 144 before applying the composite rework patch 150.

In this illustrative example, each of the plurality of adhesive layers 152 has a thickness 160 and a width 162. Thickness "t" and width "w" shown in FIG. 4 are examples of thickness 160 and width 162.

In this depicted example, the plurality of adhesive layers 152 may change in thickness 160 within at least one region of the composite rework patch 150. This change in thickness 160 forms the tapered adhesive sections 156 beneath the composite rework patch 150.

In an illustrative example, the adhesive has a variable thickness-to-width ratio 165 within each of tapered adhesive sections 156. For example, different adhesive sections may have a 30-to-1 ratio, a 20-to-1 ratio, a 10-to-1 ratio, or other ratios, depending on the particular implementation. As a result, the slope of each of the tapered adhesive sections 156 may be different.

In an illustrative example, when placing adhesive on composite structure 138, each layer of adhesive may have the same thickness but a different width. When plurality of adhesive layers 152 are stacked on top of one another with varying widths, the layers form stacks of adhesive that have different thicknesses.

Figure 21:
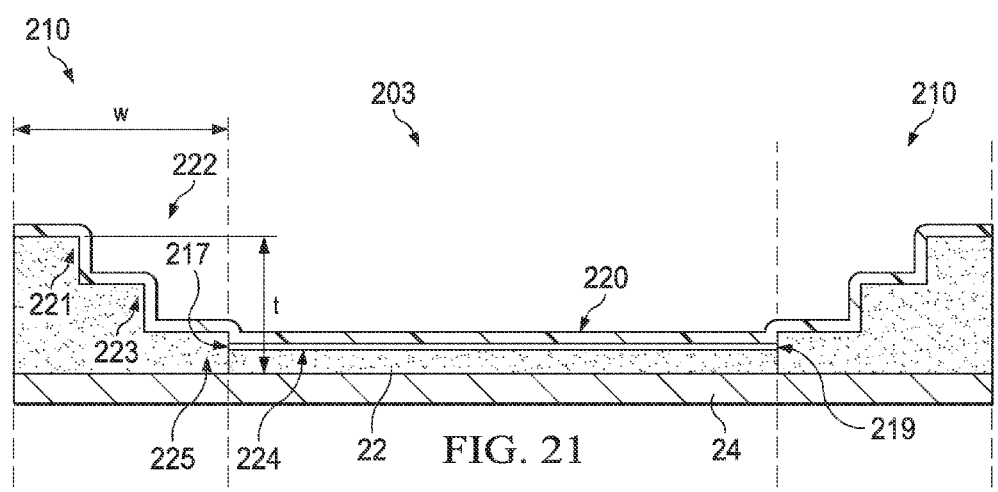
FIG. 21 is an illustration of a local sectional view of a tapered adhesive section in accordance with an illustrative embodiment.
Figure 24:
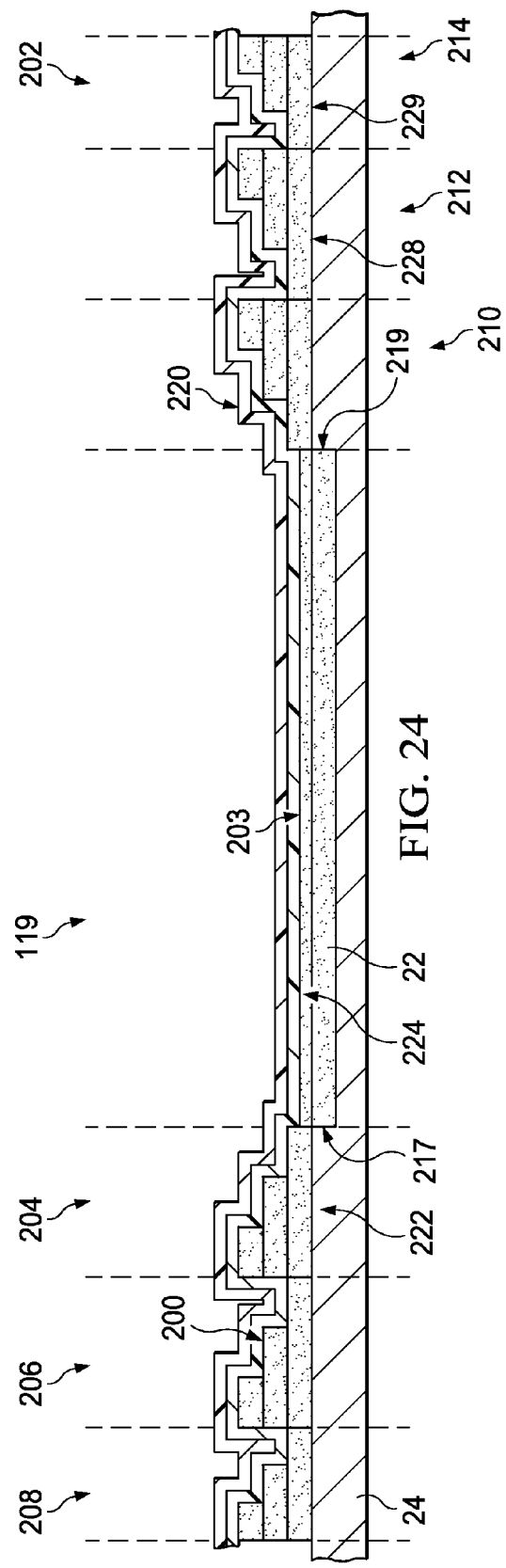
FIG. 24 is an illustration of a global sectional view of a bonded composite rework patch on a composite structure in accordance with an illustrative embodiment.

For example, when positioning the adhesive, each subsequent layer of adhesive may be narrower than the previous layer. For example, a first layer may have a first width and a second layer placed on top of the first layer may have a second width smaller than the first width. Further, a third layer placed on top of the second layer may have an even smaller width, and so on. In this manner, the plurality of adhesive layers 152 form a stair-stepped, or tapered, configuration within each of the tapered adhesive sections 156. Accordingly, the thickness-to-width ratio 156 of each of the tapered adhesive sections 156 may be different based on the number of layers stacked on top of one another, the width of those layers, or both. An illustration of this concept is shown in FIG. 21 and FIG. 24.

In the illustrative example, the tapered adhesive sections 156 formed by the plurality of adhesive layers 152 may generally correspond to the plurality of regions 158 of the composite rework patch 150. In other words, one of the tapered adhesive sections 156 may be positioned directly underneath one of the plurality of regions 158 in the composite rework patch 150.

In some cases, a greater number of tapered adhesive sections 156 may be present in the patch system 132 than the plurality of regions 158 in the composite rework patch 150. For example, without limitation, three regions may be present in the composite rework patch 150, while five tapered adhesive sections 156 may be present underneath the composite rework patch 150. In a similar fashion, a greater number of regions may be present in the composite rework patch 150 than in the plurality of adhesive layers 152. As an example, four regions may be present in the composite rework patch 150, while three or fewer tapered adhesive sections 156 may be present underneath the composite rework patch 150.

As depicted, the tapered adhesive sections 156 comprise a first section 166, a second section 168 surrounding a perimeter of the first section 166, and a third section 170 surrounding a perimeter of the second section 168. In some illustrative examples, a number of additional sections may be present. For instance, a fourth section 172 may surround a perimeter of the third section 170, and so on.

In some cases, gaps 173 may be present between one or more of the tapered adhesive sections 156. An example of an implementation for the gaps 173 is shown in FIG. 7 as "g." The gaps 173 may be circumferential gaps between the tapered adhesive sections 156 that are configured to reduce the growth of the inconsistent area 144. In other illustrative examples, the gaps 173 may not be present or may have different configurations than shown in FIG. 7.

In this illustrative example, the patch system 132 is designed such that each of the plurality of regions 158 in the composite rework patch 150 releases a strain energy 174 into and out of the composite rework patch 150 at different rates 176. In a similar fashion, each of the tapered adhesive sections 156 may be tailored to release the strain energy 174 at the different rates 176.

Specifically, the strain energy 174 may be released out of the composite structure 138 and into the composite rework patch 150 at different rates 176. The strain energy 174 may then be directed back into the composite structure 138 outside of inconsistent area 22 to arrest extension of the inconsistent area 22 and prevent disbond between the composite rework patch 150 and the composite structure 138.

In this illustrative example, the strain energy 174 is the energy stored by a system undergoing deformation under a load 178. When the load 178 is removed, strain energy 174 is gradually released as the system returns to its original shape.

A desirable release of the strain energy 174 extends the life of the patch system 132, reduces the risk of additional inconsistencies forming in the structure 136, or both. It may be desirable to release the strain energy 174 at a greater rate in portions of the composite rework patch 150 that are further away from the inconsistent area 22 to prevent extension of the inconsistent area 22.

Each of the plurality of regions 158 may have different characteristics 180 that allow for the strain energy 174 to be released at the different rates 176. Each of the tapered adhesive sections 156 also may have different characteristics 180.

In this illustrative example, the characteristics 180 may be tailored to produce the patch system 132 that performs in a desired manner during the life of the aircraft 134. The characteristics 180 may include at least one of structural properties 182, an inter-laminar fracture design 184, a structural shape 186, or other suitable types of characteristics.

In an illustrative example, the structural properties 182 refer to various load handling and load transfer characteristics of the material. For example, the structural properties 182 may refer to the ability of the material to resist elastic deformation, to release the strain energy 174, or other properties.

In this depicted example, the structural properties 182 include kinematic constants, elastic constants, constitutive constants, inter-laminar fracture toughness, and other suitable properties. In this illustrative example, the kinematic constants represent the relationship between displacement and strain in a material. Each of the tapered adhesive sections 156 have a different stress-strain relationship in this illustrative example, resulting in different kinematic constants between sections.

The elastic constants represent the degree to which a material possesses elasticity. In other words, the elastic constants represent the extent to which the material will extend or compress when the load 178 is applied. Examples of elastic constants may include Poisson's ratio, modulus of elasticity, shear rigidity, and other constants. Each of the tapered adhesive sections 156 also may have different elastic constants than one another.

Further, each of the tapered adhesive sections 156 may have different constitutive constants. The constitutive constants represent bending characteristics of a material.

In an illustrative example, the tapered adhesive sections 156 are also designed to have a different inter-laminar fracture toughness. The inter-laminar fracture toughness may be described as the general resistance of a material to inter-laminar fracture.

In this illustrative example, "inter-laminar fracture," or delamination, is an undesired separation between two layers of material. For instance, inter-laminar fracture is the separation of two composite plies. As another example, inter-laminar fracture may occur between two of the plurality of adhesive layers 152. In some cases, inter-laminar fracture may occur due to high out-of-plane loads coming from high peel stresses at the edge of the structure 136 which is under a bending load. The variable tapered adhesive is designed to effectively minimize these peel stresses.

In an illustrative example, the inter-laminar fracture toughness may be a value determined by the type of inter-laminar fracture design 184 selected for a material. In this example, the inter-laminar fracture design 184 refers to the configuration of each of the regions designed to resist inter-laminar fracture.

In this depicted example, the inter-laminar fracture design 184 of each of the plurality of regions 158 may include parameters such as ply orientation, the type of resin or matrix material used in each region, the thickness 160 of the plurality of adhesive layers 152 in each of the tapered adhesive sections 156, the width 162 of the plurality of adhesive layers 152 of each of the tapered adhesive sections 156, the position and side of gaps 173, and other design parameters.

The inter-laminar fracture design 184 for each of the tapered adhesive sections 156 may include one of Mode I, Mode II, and Mode III properties. For instance, each of the tapered adhesive sections 156 may be designed to resist tensile loads (Mode I), shear loads (Mode II), or both tensile loads and shear loads (Mode III) in a desired manner.

In this depicted example, the structural shape 186 is a geometrical configuration of each of the regions in the composite rework patch 150 and the tapered adhesive sections 156. For example, without limitation, the composite rework patch 150 may have a structural shape 186 selected from one of a circular shape, a rectangular shape, a square shape, or other suitable shapes. The structural shape 186 of the tapered adhesive sections 156 may be the same or different than the corresponding regions in the composite rework patch 150.

In some illustrative examples, the structural shape 186 of the composite rework patch 150 may vary between the plurality of regions 158. For instance, one region may have a circular shape while another region may have a rectangular shape. In other illustrative examples, the structural shape 186 for each region may be the same.

Using the characteristics 180, the patch system 132 may be designed with the tapered adhesive sections 156 to arrest the growth of the inconsistent area 144 in the structure 136. In particular, the structural properties 182 of the tapered adhesive sections 156 may aid in reducing the extension of the crack 146 in the structure 136.

In some cases, when the structure 136 is the metal structure 140, the tapered adhesive sections 156 may diminish a stress intensity 188 at the crack tip 148 on each end of the crack 146. In this illustrative example, the stress intensity 188 is the amount of stress near the crack tip 148 caused by the load 178. A diminished stress intensity 188 is desirable to arrest the growth of the crack 146.

The illustration of the patch system 132 with the tapered adhesive sections 156 in FIG. 19 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 20:
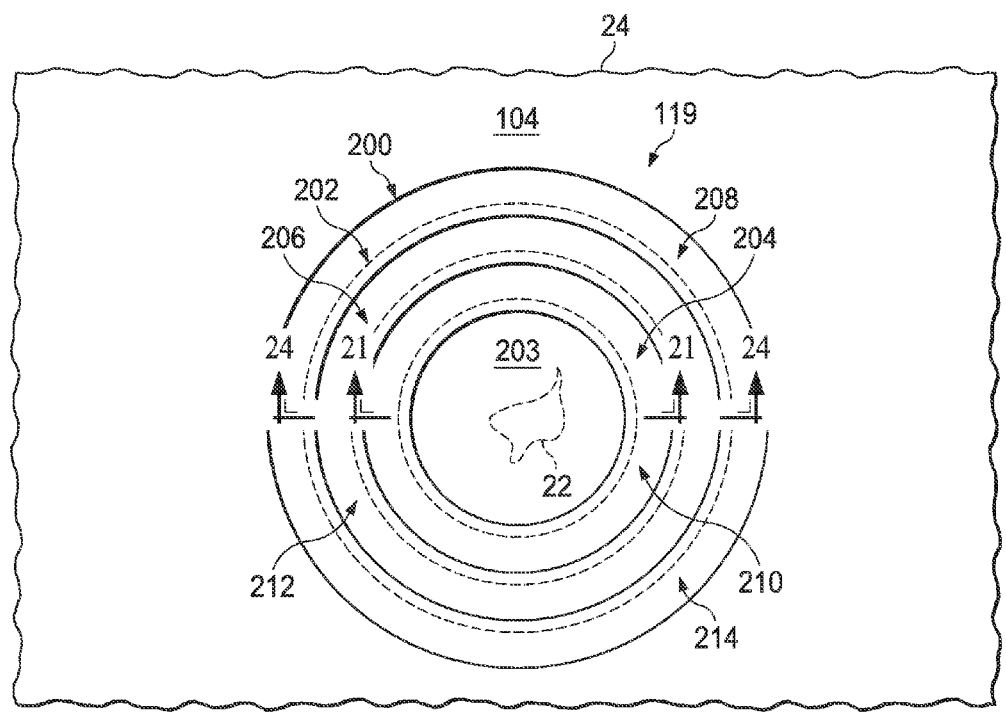
FIG. 20 is an illustration of a bonded component rework patch in accordance with an illustrative embodiment.

Turning next to FIG. 20, an illustration of a bonded composite rework patch is depicted in accordance with an illustrative embodiment. In this depicted example, an enlarged view of the composite rework patch 119 from FIG. 18 is shown. The composite rework patch 119 has been bonded to the composite structure 24 to cover the inconsistent area 22. In this illustrative example, the composite rework patch 119 includes regions 200 arranged over tapered adhesive sections 202.

The regions 200 are shown between the solid lines in this figure. Specifically, the composite rework patch 119 includes core 203, first region 204, second region 206, and third region 208. Each subsequent region extends circumferentially around the previous region.

In this illustrative example, the tapered adhesive sections 202 are shown between the dashed lines. The tapered adhesive sections 202 include a first section 210, a second section 212, and a third section 214 in this illustrative example.

As shown, the tapered adhesive sections 202 substantially correspond to the regions 200 of the composite rework patch 119. A corresponding tapered adhesive section and patch region may be referred to collectively as an "adhesive-patch region."

As depicted, each of the individual tapered adhesive sections 202 has a different inter-laminar fracture toughness. In this illustrative example, the third section 214 has a Mode I inter-laminar fracture toughness of about 4.5 in-lbs/in$^2$, the second section 212 has a Mode II inter-laminar fracture toughness of about 13.5 in-lbs/in$^2$, and the first section 210 has a Mode III inter-laminar fracture toughness of about 20.5 in-lb/in$^2$. Other values for inter-laminar fracture toughness may be realized, depending on the particular implementation.

In a depicted example, regions 200 may be designed to also have different levels of inter-laminar fracture toughness. For instance, the inter-laminar fracture toughness of the third region 208 may be between about 1.75 in-lb/in$^2$ and about 2.5 in-lb/in$^2$. The inter-laminar fracture toughness of the second region 206 may be between about 2.5 in-lb/in$^2$ and about 3.5 in-lb/in$^2$, while the first region 204 may have an inter-laminar fracture toughness equal to or greater than about 5.00 in-lb/in$^2$ in this illustrative example. In this manner, each of the different regions 200 of plies and each of the different sections of adhesive may have different properties configured to release strain energy from the composite structure 24 to the composite rework patch 119 at different rates to arrest the growth of inconsistent area 22.

In FIG. 21, an illustration of a local sectional view of a tapered adhesive section is depicted in accordance with an illustrative embodiment. In this depicted example, a sectional view of the composite rework patch 119 taken along the lines 21-21 in FIG. 20 is shown. In particular, a sectional view of adhesive tapering within first section 210 is shown.

As illustrated, the composite rework patch 119 includes composite layer 220 and adhesive layers 222. In this illustrative example, for simplicity, the different plies within composite layer 220 are not shown. In this example, the tapered adhesive section includes a number of adhesive layers 222.

As depicted, first section 210 has a variable tapered thickness-to-width ratio as it tapers from the thickest portion to the thinnest portion. The adhesive layers 222 include a high variability tapered adhesive 221, a medium variability tapered adhesive 223, and a small variability tapered adhesive 225 forming the tapered adhesive configuration in first section 210.

No gaps are present between adhesive layers 222 in this illustrative example. Further, a flat, uniform adhesive layer 224 is positioned over core 203, directly on inconsistent area 22.

Figure 23:
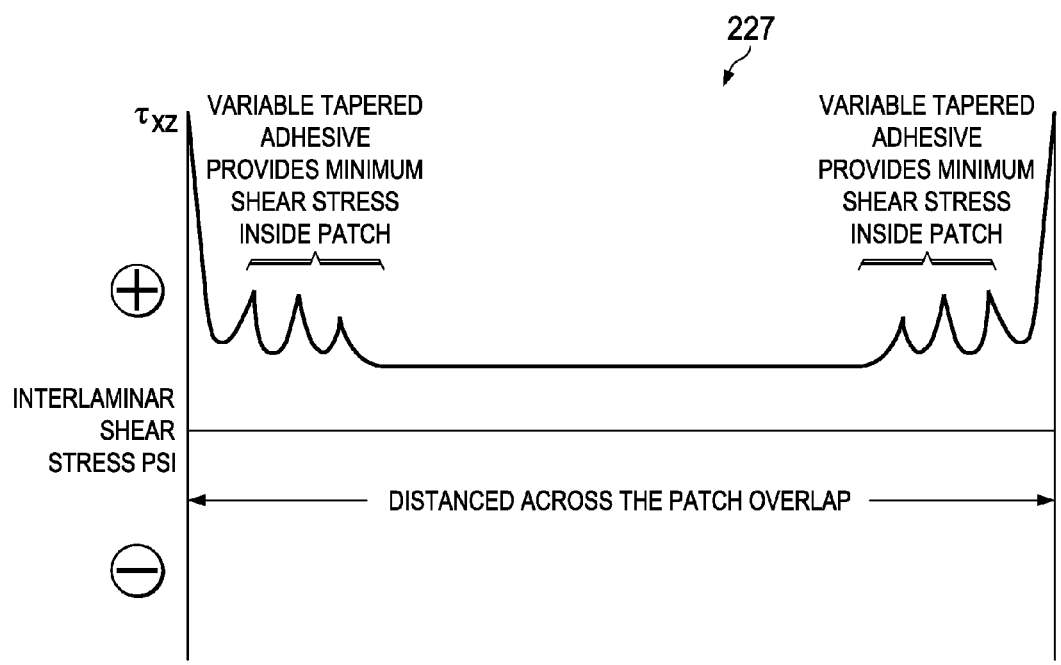
FIG. 23 is an illustration of a graph of the inter-laminar sheer stress distribution inside a bonded patch in accordance with an illustrative embodiment.

Within the inner adhesive-patch region 210-204, the airframe load is transferred from the inconsistent area 22 to the composite rework patch 119. This region distributes the initial incoming load out of the crack tip boundary 217-219 in the inconsistent area 22 and minimizes the crack tip forces. This action is achieved through an increase in Mode III inter-laminar torsional-shear capability coupled with an improved Poisson's ratio elastic constant and a reduction in inter-laminar stresses, as shown in FIGS. 22-23.

In this manner, the adhesive-patch region 210-204 substantially prevents undesirable structural plastic deformation in the composite rework patch 119. As a result, this region enhances and improves the damage tolerance of the composite rework patch 119 to prevent the extension of the inconsistent area 22. Further, this region reduces or eliminates the "unzipping" of the composite rework patch under various aerodynamic loads. "Unzipping" may disbond between the composite rework patch and the composite structure 24.

Referring next to FIG. 22, an illustration of a graph of the inter-laminar tension stress inside a bonded patch is depicted in accordance with an illustrative embodiment. In this illustrative example, a graph 226 shows the out-of-plane inter-laminar tension stress inside the composite rework patch 119.

As shown, the graph 226 shows the distance across the overlap of the patch versus the inter-laminar tension stress (psi). In this example, the out-of-plane inter-laminar tension stress inside the composite rework patch 119 is negative.

As indicated by the graph 226, the tapered adhesive layers 222 limit the stress profile. In other words, the stress distribution is small as a result of the slope of the adhesive layers 222 such that the stress becomes less of a driving force. Compared to some currently used systems without the tapered adhesive layers 222, an illustrative embodiment arrests the driving force and prevents crack propagation.

Turning next to FIG. 23, an illustration of a graph of the inter-laminar sheer stress distribution inside a bonded patch is depicted in accordance with an illustrative embodiment. In this illustrative example, a graph 227 shows the shear stress distribution inside the composite rework patch 119.

As shown, the graph 227 shows the distance across the overlap of the patch versus the inter-laminar shear stress (psi). As indicated by graph 227, the tapered adhesive layers 222 reduce the peak inter-laminar shear stress within the composite rework patch 119. This reduction enhances the damage tolerance and fatigue durability of the patch over inconsistent area 22.

In FIG. 24, an illustration of a global sectional view of a bonded composite rework patch on a composite structure is depicted in accordance with an illustrative embodiment. In this depicted example, a sectional view of the composite rework patch 119 taken along the lines 24-24 in FIG. 20 is shown.

Each of the tapered adhesive sections 202 has tapered adhesive layers in this illustrative example. In particular, the first section 210 has adhesive layers 222, the second section 212 has adhesive layers 228, and the third section 214 has adhesive layers 229. The adhesive layers 228 and the adhesive layers 229 may be tapered in the same manner or a different manner than the adhesive layers 222.

Although three adhesive layers are shown in each of tapered adhesive sections 202, other numbers of layers may be present. Five layers, nine layers, fourteen layers, or some other number of layers may be present. Also, although three composite plies are shown in composite layer 220, other numbers of plies may be used. Gaps also may be present between tapered adhesive sections 202 in some illustrative examples.

With the configuration shown in FIGS. 20-24, the composite rework patch 119 behaves in a desired manner. Within the inner adhesive-patch region 210-204, the airframe load is transferred from the inconsistent area 22 to the composite rework patch 119 and distributes the initial incoming load out of the crack tip boundary to minimize the crack tip forces, as shown and described with reference to FIGS. 21-23.

The middle adhesive-patch region 212-206 of Mode II reduces the in-plane strain energy release rate in the inconsistent area 22. In this manner, the adhesive-patch region 212-206 reduces the rate of inter-laminar and interfacial growth of inconsistent area 22. This region enhances the fatigue durability of the entire airframe composite skin. As a result, the composite structure 24 is able to carry limit load effectively.

The outer adhesive-patch region 214-208 is designed to minimize and control the unzipping effects of the composite rework patch 119. The outer adhesive-patch region 214-208 is designed to mitigate the high out-of-plane normal damaging loads effects. This control is accomplished through the design of a combination of high Mode I inter-laminar fracture toughness, elastic constants, and the variable tapered angle. This region is effective in reducing the strain energy release rate in the inconsistent area 22 by redistribution of the load into the aircraft skin. As a result, the adhesive-patch region 214-208 maintains static strength over various aerodynamic conditions such as high gust and maneuver loads.

Figure 25:
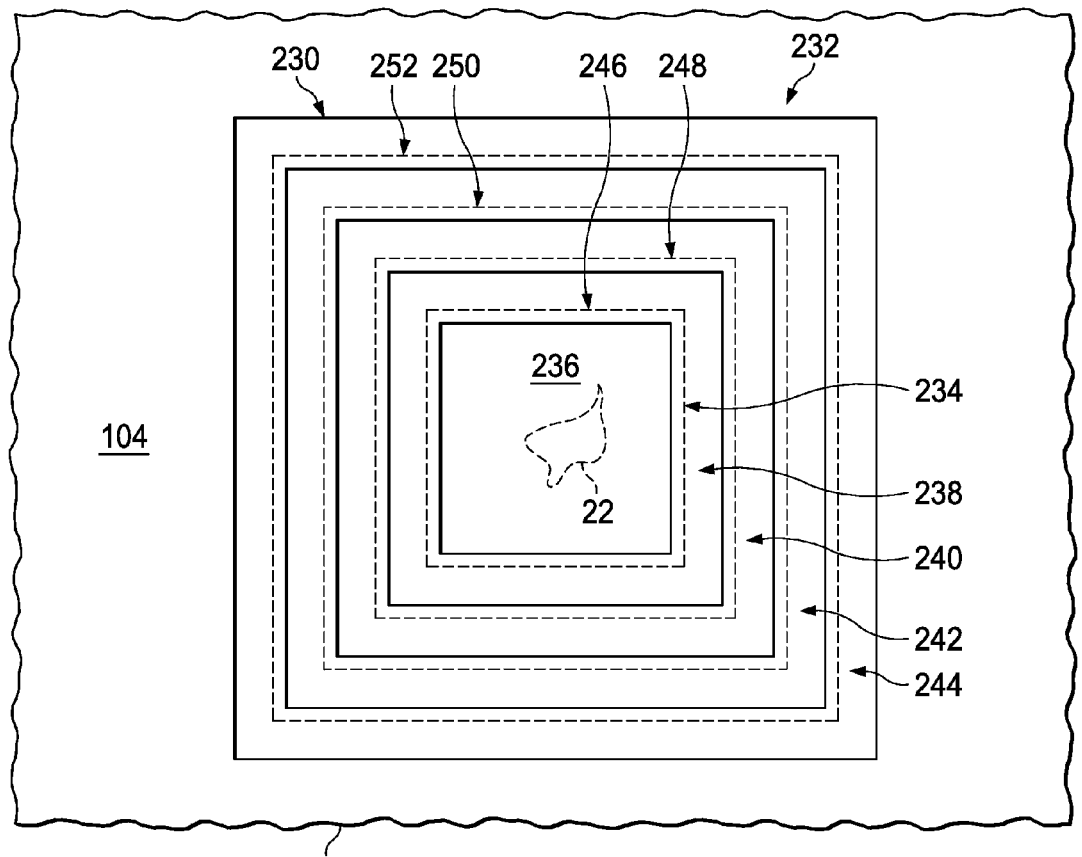
FIG. 25 is an illustration of a bonded composite rework patch in accordance with an illustrative embodiment.

Referring now to FIG. 25, an illustration of a bonded composite rework patch is depicted in accordance with an illustrative embodiment. In this depicted example, an enlarged view of a composite rework patch is shown. A composite rework patch 230 has replaced the composite rework patch 119 over inconsistent area 22 in composite structure 24.

The composite rework patch 230 is an example of another implementation for the patch system 132 shown in block form in FIG. 19. The composite rework patch 230 has been bonded to the composite structure 24 to cover the inconsistent area 22.

In this illustrative example, the composite rework patch 230 has regions 232 arranged over tapered adhesive sections 234. The regions 232, shown between the solid lines, include core 236, first region 238, second region 240, third region 242, and fourth region 244. Each subsequent region extends circumferentially around the previous region.

In this illustrative example, the tapered adhesive sections 234 are shown between the dashed lines. The tapered adhesive sections 234 include a first section 246, a second section 248, a third section 250, and fourth section 252 in this illustrative example. As shown, the tapered adhesive sections 234 substantially correspond to the regions 232 of the composite rework patch 230.

As depicted, each of the individual tapered adhesive sections 234 has different inter-laminar fracture toughness. In this illustrative example, the fourth section 252 has a Mode I inter-laminar fracture toughness of about 4.5 in-lbs/in$^2$, the third section 250 has a Mode I inter-laminar fracture toughness of about 7.5 in-lbs/in$^2$, the second section 248 has a Mode II inter-laminar fracture toughness of about 13.5 in-lbs/in$^2$, the first section 246 has a Mode III inter-laminar fracture toughness of about 20.5 in-lb/in$^2$. Other values for inter-laminar fracture toughness may be realized, depending on the particular implementation.

The regions 232 of the composite rework patch 230 may be substantially similar in inter-laminar fracture toughness to regions 200 shown and described in FIG. 20. In addition, the inter-laminar fracture toughness of fourth region 244 is less than that of third region 242. In other illustrative examples, other values may be used.

Moreover, the design of each of the regions 232 and the tapered adhesive sections 234 may be modified based on the different loads applied to the underlying structure. For instance, the design of the composite rework patch may differ based on where the composite rework patch is used on an aircraft. As an example, the structural design of the composite rework patch may be different when used on a structural skin panel of a wing than when it is used on a structural empennage. As a result, one or more of the characteristics of the regions 232, the tapered adhesive sections 234, or both may be altered to achieve desired performance.

The different configurations shown in FIGS. 20-25 are shown to illustrate some of the different designs that can be provided with the use of an illustrative embodiment. Various other configurations also may be used to develop desired structural properties for the composite rework patch 230.

Additionally, similar configurations for a patch may be used in metal applications to patch a metal structure. In such a case, the patch will be designed to reduce the stress intensity in the inconsistent area. In particular, the tapered adhesive regions are designed to reduce the stress intensity at the crack tip to arrest the growth of the crack and extend the functional life of the patch.

The illustrations and descriptions of the composite rework patch 30, the composite rework patch 119, and the composite rework patch 230 in FIGS. 1-16, and FIGS. 19-25 are not meant to imply physical or architectural limitations to the manner in which an illustrative embodiment may be implemented. Other components in addition to or in place of the ones illustrated may be used. Some components may be optional.

The different components shown FIGS. 1-16, and FIGS. 20-25 may be illustrative examples of how components shown in block form in FIG. 19 can be implemented as physical structures. Additionally, some of the components FIGS. 1-16, and FIGS. 20-25 may be combined with components in FIG. 19, used with components in FIG. 19, or a combination of the two.

Figure 26:
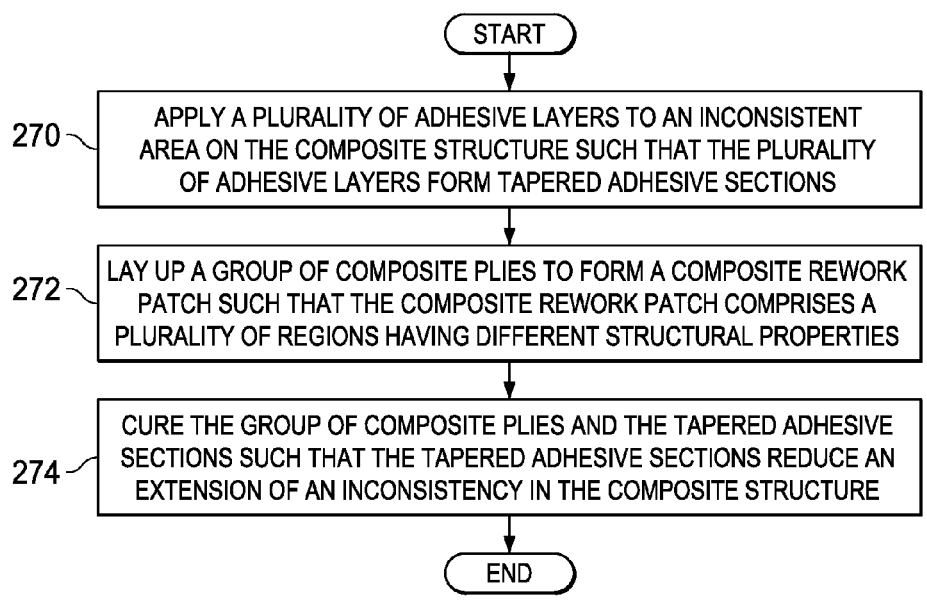
FIG. 26 is an illustration of a flowchart of a process for reworking a composite structure using a patch system with tapered adhesive sections in accordance with an illustrative embodiment.

With reference now to FIG. 26, an illustration of a flowchart of a process for reworking a composite structure using a patch system with tapered adhesive sections is depicted in accordance with an illustrative embodiment. The process illustrated in FIG. 26 may be implemented in the rework environment 130 in FIG. 19. The different operations may be implemented to form the patch system 132 on the structure 136 to arrest growth of the inconsistent area 144.

In step 270, a plurality of adhesive layers is applied to an inconsistent area on the composite structure such that the plurality of adhesive layers form tapered adhesive sections.

The plurality of adhesive layers may be applied such that each of the tapered adhesive sections has different structural properties, a different thickness-to-width ratio, or other suitable parameters.

A group of composite plies is laid up in step 272 to form a composite rework patch such that the composite rework patch comprises a plurality of regions having different structural properties. In step 274, the group of composite plies and the tapered adhesive sections are cured such that the tapered adhesive sections reduce an extension of an inconsistency in the composite structure.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of module, a segment, a function, or a portion or combination thereof of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Illustrative embodiments of the disclosure may be described in the context of aircraft manufacturing and service method 300 as shown in FIG. 27 and aircraft 320 as shown in FIG. 28. Turning first to FIG. 27, an illustration of an aircraft manufacturing and service method is depicted in accordance with an illustrative embodiment. During preproduction, the aircraft manufacturing and service method 300 may include a specification and design 302 of an aircraft 301 in FIG. 28 and a material procurement 304.

During production, component and subassembly manufacturing 306 and system integration 308 of the aircraft 301 in FIG. 28 takes place. Thereafter, the aircraft 301 in FIG. 28 may go through certification and delivery 310 in order to be placed in service 312. While in service 312 by a customer, the aircraft 301 in FIG. 28 is scheduled for routine maintenance and service 314, which may include modification, reconfiguration, refurbishment, and other maintenance or service.

Each of the processes of the aircraft manufacturing and service method 300 may be performed or carried out by a system integrator, a third party, an operator, or a combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 28, an illustration of an aircraft is depicted in which an illustrative embodiment may be implemented. In this example, the aircraft 301 is produced by the aircraft manufacturing and service method 300 in FIG. 27 and may include an airframe 316 with a plurality of systems 318 and an interior 320. Examples of the systems 318 include one or more of a propulsion system 322, an electrical system 324, a hydraulic system 326, and an environmental system 328. Any number of other systems may be included. Although an aerospace example is shown, different illustrative embodiments may be applied to other industries, such as the automotive industry.

Apparatuses and methods embodied herein may be employed during at least one of the stages of the aircraft manufacturing and service method 300 in FIG. 27. In particular, the patch system 132 with the tapered adhesive sections 156 from FIG. 19 may be installed during any one of the stages of the aircraft manufacturing and service method 300. For example, without limitation, the patch system 132 with the tapered adhesive sections 156 may be used to rework a structure in aircraft 301 during at least one of component and subassembly manufacturing 306, routine maintenance and service 314, or some other stage of the aircraft manufacturing and service method 300.

For instance, the patch system 132 may be used upon discovery of an inconsistent area in a structure in the aircraft 301. This inconsistent area may have been formed during component and subassembly manufacturing 306. Instead of discarding the structure, the area can be patched using the patch system 132 and still comply with applicable standards.

As another illustrative example, an inconsistent area in a structure in the aircraft 301 may be discovered during routine maintenance and service 314. In this case, instead of reworking all of the structure, or replacing the structure, the patch system 132 may be employed. With the use of the tapered adhesive sections 156, the life of the patch system 132, as well as the structure in the aircraft 301 may be extended.

In one illustrative example, components or subassemblies produced during component and subassembly manufacturing 306 in FIG. 27 may be fabricated or manufactured in a manner similar to components or subassemblies produced while the aircraft 301 is in service 312 in FIG. 27. As yet another example, one or more apparatus embodiments, method embodiments, or a combination thereof may be utilized during production stages, such as component and subassembly manufacturing 306 and system integration 308 in FIG. 27. One or more apparatus embodiments, method embodiments, or a combination thereof may be utilized while the aircraft 301 is in service 312, during maintenance and service 314 in FIG. 27, or a combination thereof. The use of a number of the different illustrative embodiments may substantially expedite the assembly, reduce the cost of aircraft 301, or both.

Thus, the illustrative embodiments provide a method and apparatus for reworking a structure. The structure may take the form of the composite structure 138 in the aircraft 134 in FIG. 19. In one illustrative example, an apparatus comprises the composite rework patch 150 and the plurality of adhesive layers 152 on the first side 154 of the composite rework patch 150. The first side 154 of the composite rework patch 150 has the contour 157 conforming to the inconsistent area 144 on the composite structure 138. The composite rework patch 150 comprises the plurality of regions 158 having different structural properties 182. The plurality of adhesive layers 152 change in thickness 160 within at least one region of the composite rework patch 150 to form the tapered adhesive sections 156.

The illustrative embodiments provide a combination of structural multiple regionalized adhesives integrated into composite tailored layers to form a structural patch designed to substantially retard and arrest multi-site skin cracks and complex delamination various models of aircraft. This combined complex integrated composite-adhesive rework patch with a static strength outer region, a durability strength middle region, and a damage tolerance fail-safe inner core region, as described in FIGS. 1-16, releases strain energy in a desired manner. As a result, the patch lasts longer and provides better structural integrity than some currently used systems.

Moreover, this integrated adhesive patch is designed with variable taper angles in the adhesive, which mitigate and reduce the high damaging inter-laminar shear and tension stress at the cracked skin boundaries. No bolts are used with an illustrative embodiment. As a result, the illustrative embodiments improve the global structural damage tolerance capability of the underlying composite skin.

With the introduction of the tapered adhesive regions, the composite rework patch may meet the airworthiness standards promulgated by the Federal Aviation Administration (FAA), and the European Aviation Safety Agency (EASA), among others. For example, the patch may qualify for the FAA Federal Aviation Regulation (FAR) 25-571e credit as a structurally integrated fuselage or wing repaired skin able to carry 150% limit load. The illustrative embodiments also meet various other EASA and FAA airworthiness standards.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An article of manufacture that comprises:
    a composite rework patch that comprises plies that comprise a first side that comprises a contour conforming to an inconsistent area on a composite structure, wherein the composite rework patch comprises a plurality of regions that comprise different structural properties; and
    a plurality of adhesive layers on the first side of the composite rework patch, wherein the plurality of adhesive layers change in thickness within at least one region of the composite rework patch to form tapered adhesive sections.

2. The article of manufacture of claim 1, wherein each of the tapered adhesive sections has the different structural properties.

3. The article of manufacture of claim 2, wherein the different structural properties include at least one of kinematic constants, elastic constants, constitutive constants, or inter-laminar fracture toughness in the plurality of adhesive layers.

4. The article of manufacture of claim 1, wherein each of the tapered adhesive sections comprises a different inter-laminar fracture design that comprises a design characteristic to resist at least one of: a tensile load, a shear load, and a combination of a tensile load and a shear load.

5. The article of manufacture of claim 1, wherein each of the tapered adhesive sections releases strain energy into and out of the composite rework patch at different rates.

6. The article of manufacture of claim 1, wherein the plurality of adhesive layers comprise a film adhesive.

7. The article of manufacture of claim 1, wherein the composite structure is selected from one of a control structure surface, a structural skin panel, a wing structure, and a structural empennage.

8. The article of manufacture of claim 1, wherein the inconsistent area comprises a crack and the tapered adhesive sections reduce an extension of the crack.

9. The article of manufacture of claim 1, wherein the tapered adhesive sections comprise:
    a first section;
    a second section surrounding a perimeter of the first section;
    a third section surrounding a perimeter of the second section; and
    a fourth section surrounding a perimeter of the third section.

10. The article of manufacture of claim 1, wherein the composite rework patch comprises a composite layer having a group of composite plies arranged on the tapered adhesive sections.

11. A patch system for reworking an inconsistent area of a structure comprising:
    a patch that comprises a plurality of regions that comprises different structural properties selected from a group that comprises: an ability to resist elastic deformation, kinematic constants, elastic constants, and constitutive constants; and
    a plurality of adhesive layers on the patch, wherein the plurality of adhesive layers change in thickness within at least one region of the patch to form tapered adhesive sections.

12. The patch system of claim 11, wherein the structure is a metal structure.

13. The patch system of claim 12, wherein the tapered adhesive sections reduce a stress intensity in the inconsistent area of the metal structure.

14. The patch system of claim 11, wherein each of the tapered adhesive sections has a different inter-laminar toughness.

15. The patch system of claim 11, wherein the inconsistent area of the structure comprises a crack and the tapered adhesive sections reduce a force on a crack tip to substantially prevent an extension of the crack.

* * * * *